(12) United States Patent
Lum

(10) Patent No.: US 8,006,243 B2
(45) Date of Patent: Aug. 23, 2011

(54) METHOD AND APPARATUS FOR REMOTE INSTALLATION OF NETWORK DRIVERS AND SOFTWARE

(75) Inventor: Clinton Edward Lum, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 1281 days.

(21) Appl. No.: 11/642,046

(22) Filed: Dec. 19, 2006

(65) Prior Publication Data

US 2007/0100936 A1    May 3, 2007

Related U.S. Application Data

(62) Division of application No. 09/456,894, filed on Dec. 7, 1999, now Pat. No. 7,181,486.

(51) Int. Cl.
*G06F 9/45* (2006.01)

(52) U.S. Cl. .......... 717/177; 717/172; 717/178

(58) Field of Classification Search .......... None
See application file for complete search history.

(56) References Cited

U.S. PATENT DOCUMENTS

| | | | |
|---|---|---|---|
| 4,223,380 A | 9/1980 | Antonaccio et al. | |
| 4,400,769 A | 8/1983 | Kaneda et al. | |
| 4,672,609 A | 6/1987 | Humphrey et al. | |
| 4,773,028 A | 9/1988 | Tallman | |
| 4,819,234 A | 4/1989 | Huber | |
| 4,975,950 A | 12/1990 | Lentz | |
| 5,032,979 A | 7/1991 | Hecht et al. | |
| 5,121,345 A | 6/1992 | Lentz | |
| 5,204,966 A | 4/1993 | Wittenberg et al. | |
| 5,210,704 A | 5/1993 | Husseiny | |
| 5,274,824 A | 12/1993 | Howarth | |
| 5,278,901 A | 1/1994 | Shieh et al. | 380/4 |
| 5,309,562 A | 5/1994 | Li | |
| 5,311,593 A | 5/1994 | Carmi | |
| 5,345,595 A | 9/1994 | Johnson et al. | 455/33.1 |
| 5,347,450 A | 9/1994 | Nugent | |
| 5,353,393 A | 10/1994 | Bennett et al. | |
| 5,359,659 A | 10/1994 | Rosenthal | |
| 5,371,852 A | 12/1994 | Attanasio et al. | |
| 5,398,196 A | 3/1995 | Chambers | |

(Continued)

FOREIGN PATENT DOCUMENTS

EP    0 636 977    5/2001

(Continued)

OTHER PUBLICATIONS

ICE Cap Administrator's Guide Version 1.0 BETA, Network ICE, 1999, Network Ice Corporation. [Pertinent pp. 10-12, paragraphs 1-12].

(Continued)

*Primary Examiner* — Chuck O Kendall
(74) *Attorney, Agent, or Firm* — King & Spalding LLP

(57) ABSTRACT

A method and apparatus for remote installation of network drivers and software. The present invention provides for the remote installation of a rerouting driver into the network driver interface in the path between one or more media access control units and one or more protocol drivers in a computer system. Code in the network driver interface is disabled, patched to insert the rerouting driver, and then re-enabled. The disabling and re-enabling of the code is performed such that the computer system does not have to be restarted following installation of the patch.

25 Claims, 10 Drawing Sheets

COPY INSTALL APPLICATION, DLL, AND REROUTING DRIVER REMOTELY ONTO TARGET COMPUTER    400

START SERVICE (THE INSTALL APPLICATION)    410

U.S. PATENT DOCUMENTS

| | | |
|---|---|---|
| 5,414,833 A | 5/1995 | Hershey et al. ............... 395/575 |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. ............... 395/650 |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. ............... 395/186 |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,651,059 A | 7/1997 | Morgan et al. |
| 5,664,191 A | 9/1997 | Davidson et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,715,395 A | 2/1998 | Brabson et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,781,776 A | 7/1998 | Johnston et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,915 A | 2/1999 | Dykes et al. |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,905,859 A | 5/1999 | Holloway et al. |
| 5,907,834 A | 5/1999 | Kephart et al. |
| 5,919,257 A | 7/1999 | Trostle |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,274 A | 12/1999 | Fletcher et al. |
| 6,009,467 A | 12/1999 | Ratcliff et al. |
| 6,014,645 A | 1/2000 | Cunningham |
| 6,014,740 A | 1/2000 | Searer, Jr. |
| 6,016,553 A | 1/2000 | Schneider et al. |
| 6,021,510 A | 2/2000 | Nachenberg |
| 6,026,442 A | 2/2000 | Lewis et al. ............... 709/229 |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,158,018 A | 12/2000 | Bernasconi et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 | 2/2001 | Todd, Sr. et al. |
| 6,195,687 B1 | 2/2001 | Greaves et al. |
| 6,199,181 B1 | 3/2001 | Rechef et al. |
| 6,205,552 B1 | 3/2001 | Fudge |
| 6,220,768 B1 | 4/2001 | Barroux |
| 6,226,372 B1 | 5/2001 | Beebe et al. |
| 6,230,288 B1 | 5/2001 | Kuo et al. |
| 6,247,175 B1 | 6/2001 | Ledford et al. |
| 6,260,157 B1 | 7/2001 | Schurecht et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 | 8/2001 | Bond et al. |
| 6,275,942 B1 | 8/2001 | Bernhard et al. |
| 6,278,886 B1 | 8/2001 | Hwang |
| 6,279,113 B1 | 8/2001 | Vaidya |
| 6,279,153 B1 * | 8/2001 | Bi et al. ............... 717/171 |
| 6,282,546 B1 | 8/2001 | Gleichauf et al. |
| 6,298,445 B1 | 10/2001 | Shostack et al. |
| 6,301,668 B1 | 10/2001 | Gleichauf et al. |
| 6,314,515 B1 | 11/2001 | Miller et al. |
| 6,314,520 B1 | 11/2001 | Schell et al. |
| 6,314,525 B1 | 11/2001 | Mahalingham et al. |
| 6,321,338 B1 | 11/2001 | Porras et al. |
| 6,324,627 B1 | 11/2001 | Kricheff et al. |
| 6,324,647 B1 | 11/2001 | Bowman-Amuah |
| 6,324,656 B1 | 11/2001 | Gleichauf et al. |
| 6,338,141 B1 | 1/2002 | Wells |
| 6,347,374 B1 | 2/2002 | Drake et al. |
| 6,353,385 B1 | 3/2002 | Molini et al. |
| 6,357,008 B1 | 3/2002 | Nachenberg |

| | | |
|---|---|---|
| 6,377,994 B1 | 4/2002 | Ault et al. |
| 6,381,218 B1 | 4/2002 | McIntyre et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,453,345 B2 | 9/2002 | Trcka et al. |
| 6,453,346 B1 | 9/2002 | Garg et al. |
| 6,460,141 B1 | 10/2002 | Olden |
| 6,463,426 B1 | 10/2002 | Lipson et al. |
| 6,467,002 B1 | 10/2002 | Yang |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,203 B1 | 11/2002 | Porras et al. |
| 6,487,666 B1 | 11/2002 | Shanklin et al. |
| 6,493,752 B1 | 12/2002 | Lee et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1 | 2/2004 | Wood et al. |
| 6,704,874 B1 | 3/2004 | Porras et al. |
| 6,708,212 B2 | 3/2004 | Porras et al. |
| 6,711,127 B1 | 3/2004 | Gorman et al. |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 | 4/2004 | Schuba et al. |
| 6,775,780 B1 | 8/2004 | Muttik |
| 6,792,144 B1 | 9/2004 | Yan et al. |
| 6,792,546 B1 | 9/2004 | Shanklin et al. |
| 6,816,973 B1 | 11/2004 | Gleichauf et al. |
| 6,839,850 B1 | 1/2005 | Campbell et al. |
| 6,851,057 B1 | 2/2005 | Nachenberg |
| 6,871,284 B2 | 3/2005 | Cooper et al. |
| 6,886,102 B1 | 4/2005 | Lyle |
| 6,889,168 B2 | 5/2005 | Hartley et al. |
| 6,912,676 B1 | 6/2005 | Gusler et al. |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |

FOREIGN PATENT DOCUMENTS

| | | |
|---|---|---|
| EP | 0 985 995 | 8/2003 |
| JP | 08-227387 | 9/1996 |
| JP | 10-021067 | 1/1998 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | WO 02/056152 | 7/2002 |
| WO | WO 02/101516 | 12/2002 |

OTHER PUBLICATIONS

NetRanger User's Guide Version 2.1.1, Cisco Systems, Inc., 1998. [Pertinent pp. 5-13 to 5-22, Installation].

RealSecure, Adaptive Network Security Manager Module Programmer's Reference Manual, Internet Security Systems, Inc., Feb. 1999, pp. 1-74. [Pertinent pp. 3-4, paragraph A].

Internet Scanner SAFE SAFEsuite 4.0 User Guide and Reference Manual, 1996, Internet Security Systems, Inc., pp. 1-158. [Pertinent pp. 2-3 to 2-4].

Essex, David, E-Sleuths Make Net Safe for E-Commerce, Computerworld, Jun. 2000, pp. 1-2.

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon-A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989 of Sep. 19, 2002.

International Search Report for PCT/US02/02917 of Aug. 8, 2002.

International Search Report for PCT/US03/00155 of May 15, 2003.

NXI Communications, Inc., White Paper, NTS Security Issues, Oct. 15, 2001, pp. 1-12.

Mounji et al., Distributed Audit Trail Analysis, Proceedings of the Symposium of Network and Distributed System Security, San Diego, CA, Feb. 16-17, 1995, pp. 102-112.

Wobber et al., Authentication in the Taos Operating System, ACM Transactions on Computer Systems, vol. 12, No. 1, Feb. 1994, pp. 3-32.

Mayer et al., The Design of the Trusted Workstation: A True Infosec Product, 13th National Computer Security Conference, Washing, DC, Oct. 1-4, 1990, pp. 827-839.

Dawson, Intrusion Protection for Networks, Byte, Apr. 1995, pp. 171-172.

Buhkan, Checkpoint Charlie, PC Week Network, Nov. 27, 1995, pp. N1, N6-N7.

Process Software Technical Support Page, found on http://www.process.com/techsupport/whitesec.html, printed off of the Process Software website on Feb. 26, 2003, pp. 1-5.

Ganesan, BAfirewall: A Modern Firewall Design, Proceedings Internet Society Symposium on Network and Distributed System Security 1994, Internet Soc., 1994, pp. 99-108.

Lee, Trusted Systems, Chapter II-1-6 of Handbook of Information Security Management, Ed. Zella G. Ruthberg and Harold F. Tipton, Auerbach, Boston and New York, 1993, pp. 345-362.

Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.

Guha et al., Network Security via Reverse Engineering of TCP Code: Vulnerability Analysis and Proposed Solution, IEEE, Mar. 1996, pp. 603-610.

Garg et al., High Level Communication Primitives for Concurrent Systems, IEEE, 1988, pp. 92-99.

Hastings et al., TCP/IP Spoofing Fundamentals, IEEE, May 1996, pp. 218-224.

Snapp, Signature Analysis and Communication Issues in a Distributed Intrusion Detection System, Master Thesis, University of California, Davis, California, 1991, pp. 1-40.

Guha et al., Network Security via Reverse Engineering of TCP Code: Vulnerability Analysis and Proposed Solutions, IEEE, Jul. 1997, pp. 40-48.

Djahandari et al., An MBone for an Application Gateway Firewall, IEEE, Nov. 1997, pp. 72-81.

Kim et al., Implementing a Secure Login Environment: A Case Study of Using a Secure Network Layer Protocol, Department of Computer Science, University of Alabama, Jun. 1995, pp. 1-9.

Satyanarayanan, Integrating Security in a Large Distributed System, Acm Transaction on Computer Systems, vol. 7, No. 3, Aug. 1989, pp. 47-280.

Sammons, Nathaniel, "Multi-platform Interrogation and Reporting with Rscan," The Ninth Systems Administration Conference, LISA 1995, Monterrey, California, Sep. 17-22, 1995, pp. 75-87.

Dean et al., "Java Security: From HotJava to Netscape and Beyond," Proceedings of the 1996 IEEE Symposium on Security and Privacy, May 6-8, 1996, Oakland, California, pp. 190-200.

Fisch et al., "The Design of an Audit Trail Analysis Tool," Proceedings of the 10th Annual Computer Security Applications Conference, Dec. 5-9, 1994, Orlando, Florida, pp. 126-132.

Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.

Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.

Casella, Karen A., "Security Administration in an Open Networking Environment," The Ninth Systems Administration Conference, LISA 1995, Monterrey, California, Sep. 17-22, 1995, pp. 67-73.

Burchell, Jonathan, "Vi-SPY: Universal NIM?" Virus Bulletin, Jan. 1995, pp. 20-22.

Benzel et al., "Identification of Subjects and Objects in a Trusted Extensible Client Server Architecture," 18th National Information Systems Security Conference, Oct. 10-13, 1995, Baltimore, Maryland, pp. 83-99.

Epstein et al., "Component Architectures for Trusted Netware," 18th National Information Systems Security Conference, Oct. 10-13, 1995, Baltimore, Maryland, pp. 455-463.

Varadharajan, Vijay, "Design and Management of a Secure Networked Administration System: A Practical Approach," 19th National Information Systems Security Conference, Oct. 22-25, 1996, Baltimore, Maryland, pp. 570-580.

Snapp et al., "DIDS (Distributed Intrusion Detection System)—Motivation, Architecture, and An Early Prototype," 14th National Computer Security Conference, Oct. 1-4, 1991, Washington, DC, pp. 167-176.

Broner et al., "IntelligentI/O Rule-Based Input/Output Processing for Operating Systems," Operating Systems Review, vol. 25, No. 3, Jul. 1991, pp. 10-26.

Drews et al., "Special Delivery—Automatic Software Distribution Can Make You a Hero," Network Computing, Aug. 1, 1994, pp. 80, 82-86, 89, 91-95.

Morrissey, Peter, "Walls," Network Computing, Feb. 15, 1996, pp. 55-59, 65-67.

Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.

Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.

Anderson, Paul, "Towards a High-Level Machine Configuration System," Proceedings of the Eighth Systems Administration Conference (LISA VIII), Sep. 19-23, 1994, San Diego, California, pp. 19-26.

Cooper, Michael A., "Overhauling Rdist for the '90s," Proceedings of the Sixth Systems Administration Conference (LISA VI), Oct. 19-23, 1992, Long Beach, California, pp. 175-188.

Vangala et al., "Software Distribution and Management in a Networked Environment," Proceedings of the Sixth Systems Administration Conference, Oct. 19-23, 1992, Long Beach, California, pp. 163-170.

Kim et al., "The Design and Implementation of Tripwire: A File System Integrity Checker," 2nd ACM Conference on Computer and Communications Security, Nov. 2-4, 1994, Fairfax, Virginia, pp. 18-29.

Winn Schwartau, "e.Security™-Solving 'Dumb Days' With Security Visualization," e-Security, Inc., Naples, FL 34103, 2000.

Anita D'Amico, Ph.D., "Assessment of Open e-Security Platform™: Vendor-Independent Central Management of Computer Security Resources," Applied Visions, Inc., 1999.

"e.Security™-Open Enterprise Security Management: Delivering an integrated, automated, centrally Managed Solution You Can Leverage Today and Tomorrow," e-Security, Inc., Naples, FL 34102, 1999.

"e.Security ™-Vision," e-Security, Inc., Naples, FL, 1999.

"e.Security™-Administrator Workbench™," e-Security, Inc. Naples, FL, 1999.

"e.Security™-Fact Sheet," e-Security, Inc., Naples, FL, 1999.

"e.Security™-Open e-Security Platform™," e-Security, Inc. Naples, FL, 1999.

Babcock, "E-Security Tackles the Enterprise," Jul. 28, 1999; Inter@ctive Week, www.Zdnet.com.

Kay Blough, "In Search of More-Secure Extranets," Nov. 1, 1999, www.InformationWeek.com.

Paul H. Desmond, "Making Sense of Your Security Tools," Software Magazine and Wiesner Publishing, www.softwaremag.com, 1999.

Kay Blough, "Extra Steps Can Protect Extranets," Nov. 1, 1999, www. InformationWeek.com.

Sean Hao, "Software protects e-commerce—e-Security's product alerts networks when hackers attack," Florida Today, Florida.

Scott Weiss, "Security Strategies—E-Security, Inc.," product brief, Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

e.Security—"Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems for Intrusions," Apr. 3, 2000, Post-Newsweek Business Information, Inc., www.gcn.com.

e.Security™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up! —Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, pp. 247.

Lee et al., A Generic Virus Detection Agent on the Internet, IEEE, 30$^{th}$ Annual Hawaii International Conference on System Sciences, 1997, vol. 4.

Cutler, Inside Windows NT, 1993, Microsoft Press.

Duncan, Advanced MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associates, A Network Associates Executive White Paper, pp. 1-14.

Enterprise-Grade Anti-Virus Automation in the 21$^{st}$ Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from the Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, 3$^{rd}$ International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/djgpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.

International Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www.bfs.ucsd.edu/mss/esos/man3.htm, Sep. 3, 1996.

Nasire, Nasirc Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, Idamn: An Intrusion Detection Architecture for Mobile Networks, IEEE Journal on Selected Areas in Communications, vol. 15, No. 7, Sep. 1997, pp. 1373-1380.

Info: Visual Basic Supports P-Code and Native Code Compilation (Q229415), http://support.microsoft.com/support/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NeworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nwfusion.com/cgi-bin/mailto/x.cgi, Jun. 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp. 1-2.

Rogers, Network ICE Signs Resellers, May 26, 1999, San Mateo, California, http://www.crn.com/showArticle.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.

Internet Security Systems, What is the Format of "Attack-List.CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1st USENIX Workshop on Intrusion Detection and Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.

Raynaud et al., Integrated Network Management IV, 1995, Proceedings of the 4th International Symposium on Integrated Network Management, pp. 1-2 and 5-16.

Heberlein et al., A Method to Detect Intrusive Activity in a Networked Environment, Oct. 1-4, 1991, 14th National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmK1m2QoJ:www.veritas.com/us/aboutus/pressroom/199....

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.jsp?type=Financial&oid=14515, pp. 1-5.

LaPadula, State of the Art in CyberSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real-Time Intrusion-Detection Expert System, Aug. 1985, pp. 1-70.

SRI International, An Intrusion-Detection Model, Nov. 1985, pp. 1-29.

Dowell et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

Sebring et al., Expert Systems in Intrusion Detection: A Case Study, Oct. 1988, pp. 74-81.

Shieh et al., A Pattern-Oriented Intrusion-Detection Model and Its Applications, 1991, pp. 327-342.

Smaha, Stephen, Haystack: An Intrusion Detection System, 1988.

Snapp, Steven Ray, Signature Analysis and Communication Issues in a Distributed Intrusion Detection System, 1991, pp. 1-40.

Porras et al., EMERALD: Event Monitoring Enabling Responses to Anomalous Live Disturbances, Oct. 1997, pp. 353-365.

Lunt et al., Knowledge-Based Intrusion Detection, Mar. 1989, pp. 102-107.

Lunt et al., An Expert System to Classify and Sanitize Text, Dec. 1987, pp. 1-5.

Tener, William, Computer Security in the Age of Information, AI & 4GL: Automated Detection and Investigation Tools, 1989, pp. 23-29.

Teng et al., Adaptive Real-time Anomaly Detection Using Inductively Generated Sequential Patterns, 1990, pp. 278-284.

Vaccaro et al., Detection of Anomalous Computer Session Activity, 1989, pp. 280-289.

Winkler, J.R., A UNIX Prototype for Intrusion and Anomaly Detection in Secure Networks, 1990, pp. 115-124.

Boyen et al. Tractable Inference for Complex Stochastic Process, Jul. 24-26, 1998.

Copeland, Observing Network Traffic—Techniques to Sort Out the Good, the Bad, and the Ugly, 2000, pp. 1-7.

Goan, Terrance, Communications of the ACM, A Cop on the Beat Collecting and Appraising Intrusion Evidence, Jul. 1999, pp. 47-52.

Heberlein et al., A network Security Monitor, 1990, pp. 296-304.

Jackson et al., An Expert System Applications for Network Intrusion Detection, Oct. 1991, pp. 1-8.

Lankewicz et al., Real-Time Anomaly Detection Using a Nonparametric Pattern Recognition Approach, 1991, pp. 80-89.

Lippmann et al., Evaluating Intrusion Detection Systems: The 1998 DARPA Off-line Intrusion Detection Evaluation, 1999.

Munson et al., Watcher: The Missing Piece of the Security Puzzle, Dec. 2001.

Pearl, Judea, Probabilistic Reasoning in Intelligent Systems: Networks of Plausible Inference, Sep. 1988.

Porras et al., Live Traffic Analysis of TCP/IP Gateways, Dec. 12, 1997, pp. 1-13.

EMERALD TCP Statitical Analyzer 1998 Evaluation Results, http://www.sdl.sri.com/projects/emerald/98-eval-estat/index.html, Jul. 9, 1999, pp. 1-15.

Staniford-Chen, GrIDS-A Graph Based Intrusion Detection System for Large Networks, Oct. 1996.

Tener, William, Discovery: An Expert System in the Commercial Data Security Environment, Dec. 1986, pp. 45-53.

Valdes et al., Adaptive, Model-Based Monitoring for Cyber Attack Detection, 2000, pp. 1-19.

SRI International, Blue Sensors, Sensor Correlation, and Alert Fusion, Oct. 4, 2000.

Valdes et al., Statistical Methods for Computer Usage Anomaly Detection Using NIDES, Jan. 27, 1995, pp. 306-311.

Wimer, Scott, The Core of CylantSecure, http://www.cylant.com/products/core.html, 1999, pp. 1-4.

Zhang et al., A Hierarchical Anomaly Network Intrusion Detection System using Neural Network Classification, Feb. 2001.

Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.

Linux Weekly News, http://lwn.net/1998/0910shadow.html, Sep. 8, 1998, pp. 1-38.

Cracker Tracking: Tighter Security with Intrucsion Detection, http://www.bvte.com/art/9805/sec20/artl.htm, May 1998, pp. 1-8.

Cisco Systems, Inc., Newtork RS: Intrusion Detection and Scanning with Active Audit Session 1305, 1998.

Business Security Advisor Magazine, Intrusion Detection Systems: What You Need to Know, http://advisor.com/doc/0527, Sep. 1998, pp. 1-7.

Garvey et al., An Inference Technique for Integrating Knowledge from Disparate Sources, Multisensor Integration and Fusion for Intelligenct Machines and Systems, 1995, pp. 458-464.

Power et al., CSI Intrusion Detection System Resource, Jul. 1998, pp. 1-7.

Cisco Systems, Inc., NetRanger User's Guide Version 2.1.1, 1998.

Internet Security Systems, Real-Time Attack Recognition and Response: A Solution for Tightening Network Security, http://www.iss.net, 1997, pp. 1-13.

Network ICE Corporation, Network ICE Product Documentation, pp. 1-3, http://www.web.archive.org/web/20011005080013/www.networkice.com/support/documentation.html, Jul. 6, 2004.

Network ICE Corporation, Network ICE Documentation, p. 1, http://www.web.archive.org/web/19991109050852/www.networkice.com/support/docs.htm, Jul. 6, 2004.

Network ICE Corporation, Network ICE Press Releases, p. 1, http://www.web.archive.org/web/19990903214428/www.netice.com/company/pressrelease/press.htm, Jul. 7, 2004.

Network ICE Corporation, Network ICE Press Releases, p. 1, http://www.web.archive.org/web/20000304074934/www.netice.com/company/pressrelease/press.htm, Jul. 7, 2004.

Brentano et al., An Architecture for Distributed Intrusion Detection System, Department of Energy Computer Security Group, $14^{th}$ Annual Conference Proceedings, pp. (17)25-17(45), May 1991.

Staniford-Chen et al., GrIDS-A Graph Based Intrusion Detection System for Large Networks, University of California, Davis, California, $19^{th}$ National Information Systems Security Conference, 1996, pp. 1-10.

Ricciulli et al., Modeling Correlated Alarms in Network Management Systems, SRI International, Menlo Park, California, Proceedings of the Conference on Communication Networks and Distributed System Modeling and Simulation, 1997, pp. 1-8.

Porras et al., Emerald: Event Monitoring Enabling Responses to Anomalous Live Disturbances, SRI International, Menlo Park, California, $20^{th}$ National Information Systems Security Conference, Oct. 1997, pp. 1-24.

Porras et al., A Mission-Impact Based Approach to INFOSEC Alarm Correlation, SRI International, Menlo Park, California, Oct. 2002, pp. 1-33.

Phrack 55 Download (234 kb, Sep. 9, 1999), http://www.phrack.org/show.php?p=55&a=9, pp. 1-6.

Porras et al., A Mission-Impact-Based Approach to INFOSEC Alarm Correlation, SRI International, Menlo Park, California, Oct. 2002, pp. 1-19.

Bace, An Introduction to Intrusion Detection and Assessment for System and Network Security Management, 1999, pp. 1-38.

Hunteman, Automated Information System—(AIS) Alarm System, University of California, Los Alamos National Laboratory, $20^{th}$ National Information System Security Conference, Oct. 1997, pp. 1-12.

Janakiraman et al., Indra: A Peer-to-Peer Approach to Network Intrusion Detection and Prevention, Proceedings of the $12^{th}$ International Workshop on Enabling Technologies: Infrastructure for Collaborative Enterprises, 2003, pp. 1-5.

Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b...

Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.

Lunt et al., Knowledge-Based Intrusion Detection, SRI International, Menlo Park, California, Conference on AI Systems in Government, Washington, D.C., Mar. 1989, pp. 102-107.

A. Information Assurance BAA 98-34 Cover Sheet, SRI International, Nov. 1, 2000, pp. 2-35.

NetScreen Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the $13^{th}$ National Computer Security Conference, Washington, D.C., Oct. 1990, pp. 109-114.

Snapp et al., DIDS (Distributed Intrusion Detection System)—Motivation, Architecture, and an Early Protype), University of California, Davis California Proc. 14th National Computer Security Conference, Washington, D.C., Oct. 1991, pp. 167-176.
Internet Security Systems, Inc., SAFEsuite Enterprise Edition, Project "Gatekeeper" 1.0, Market Requirements Document, Mar. 30, 1998, pp. 1-12.
Internet Security Systems, SAFEsuite Decisions, 2000, pp. 1-2.
Internet Security Systems, Dynamic Threat Protection, Presse-Roundtable, Munich, Germany, Apr. 10, 2003, pp. 1-63.
Internet Security Systems, Preliminary ODM 1.0 Functional Specification, Aug. 1997, pp. 1-7.
Internet Security Systems, Inc., Scanner-ISSDK Interface, Design Specification, Jun. 2, 2000, Draft 1.07, pp. 1-7.
RealSecure, Adaptive Network Security Manager Module Programmer's Reference Manual, pp. 1-74.
Advanced Concept Technology Demonstrations (ACTD), 2005, pp. 1-28.
Frank, Sounding the Alarm, Sep. 6, 1999, Federal Computer Week, pp. 1-2.
Crumb, Intrusion Detection Systems to be Integrated at AFRL, Air Force Research Laboratory, News@AFRL, Fall 1999, pp. 1.
Temin, Case Study: The IA: AIDE System at Two, 15th Annual Computer Security Applications Conference, Dec. 6-10, 1999, Phoenix, Arizona, pp. 1-26.
Spink, Automated Intrusion Detection Environment (AIDE), Intrusion Detection Sensor Fusion, Sep. 7, 1999, pp. 1-25.
Frincke et al., A Framework for Cooperative Intrusion Detection, 21st National Information Systems Security Conference, Oct. 6-9, 1998, Crystal City, Virginia, pp. 1-20.
Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.
Valdes et al., SRI International, Probabilistic Alert Correlation, 2001, pp. 1-15.
Bass, Multisensor Data Fusion for Next Generation Distributed Intrusion Detection Systems, Apr. 28, 1999, IRIS National Symposium, pp. 1-6.
Perrochon et al., Enlisting Event Patterns for Cyber Battlefield Awareness, No Date, Stanford University, pp. 1-12.
Perrochon, Using Context-Based Correlation in Network Operations and Management, Jul. 2, 1999, Stanford University, pp. 1-20.
Perrochon, Real Time Event Based Analysis of Complex Systems, Jun. 1998, pp. 1-9.
Luckham et al., Complex Event Processing in Distributed Systems, Aug. 18, 1988, Stanford University, pp. 1-26.
Pettigrew, US Southcom United States Southern Command's Information Sharing Projects, Summer 1999, IAnewsletter, vol. 3, No. 1, pp. 1-24.
Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.
Cheung et al., The Design of GrIDS: A Graph-Based Intrusion Detection System, Jan. 26, 1999, University of California, pp. 1-51.
Cohen et al., Report of the Reporting and Analysis Track, Detection of Malicious Code, Intrusions, and Anomalous Activities Workshop, Feb. 22-23, 1999, pp. 1-47.
Garofalakis et al., Network Mining and Analysis: The Nemesis Project, Bell Labs, Lucent Technologies, No Date, pp. 1-12.
RealSecure ICEcap Manager User Guide Version 3.6, Internet Security Systems, Inc., 1998-2002, pp. 1-228.
Cuppens, Cooperative Intrusion Detection, Date Unknown, pp. 1-10.
Mukherjee et al., Network Intrusion Detection, IEEE Network, May/Jun. 1994, pp. 26-41.
Machlis, Net Monitoring Tools Gain Real-Time Alerts, Apr. 14, 1997, http://www.computerworld.com, pp. 1-12.
OmniGuard/ITA Intruder Alert, AXENT Technologies, Inc., Nov. 17, 2004, http://www.web.archive.org, pp. 1-10.
NetRanger Overview, Chapter 1, Date Unknown, pp. 1-16.
Sutterfield, Large-Scale Network Intrusion Detection, 1997, WheelGroup Corporation, pp. 1-10.
Kumar et al., An Application of Pattern Matching in Intrusion Detection, Technical Report No. CSD-TR-94-013, Jun. 17, 1994, Purdue University, pp. 1-55.
Huang et al., A Large-Scale Distributed Intrusion Detection Framework Based on Attack Strategy Analysis, Date Unknown, The Boeing Company, pp. 1-12.
Perrochon et al., Event Mining with Event Processing Networks, Date Unknown, Stanford University, pp. 1-4.
Gruschke, Integrated Event Management: Event Correlation Using Dependency Graphs, presented at DSOM 1998, University of Munich, pp. 1-12.
Bass, Intrusion Detection System and Multisensor Data Fusion, Apr. 2000, Communications of the ACM, vol. 43, No. 4, pp. 99-105.
Bass et al., A Glimpse into the Future of ID, Date Unknown, Usenix, pp. 1-10.
LaPadula, State of the Art in Anomaly Detection and Reaction, Jul. 1999, Mitre Corporation, pp. 1-36.
Rationalizing Security Events with Three Dimensions of Correlation, Date Unknown, NetForensics, Tech Brief, pp. 1-6.
Jou et al., Design and Implementation of a Scalable Intrusion Detection System for the Protection of Network Infrastructure, Date Unknown, MCNC, pp. 1-15.
Caldwell, Event Correlation: Security's Holy Grail?, Aug. 1, 2002, GuardedNet, pp. 1-21.
Metcalf et al., Intrusion Detection System Requirements, Sep. 2000, Mitre Corporation, pp. 1-33.
Jou et al., Architecture Design of a Scalable Intrusion Detection System for the Emerging Network Infrastructure, Technical Report CDRL A005, Apr. 1997, MCNC, pp. 1-42.
Security Manager for UNIX Systems Version 3.2.1 User's Guide, Feb. 1998, Internet Security Systems, pp. 1-162.
RealSecure Release 1.2 for UNIX a User Guide and Reference Manual, 1997, Internet Security Systems, Inc., pp. 1-92.
Internet Scanner SAFE SAFEsuite 4.0 User Guide and Reference Manual, 1996, Internet Security Systems, Inc., pp. 1-158.
Internet Scanner 3.3 User Guide and Reference Manual, 1996, Internet Security Systems, Inc., pp. 1-119.
Landwehr et al., Newsletter of the IEEE Computer Society's TC on Security and Privacy Electronics, Electronic CIPHER, Nov. 25, 1997, Issue 25, pp. 1-34.
20th National Information Systems Security Conference, Oct. 6-10, 1997, Baltimore, Maryland, pp. 1-44.
EMERALD Alert Management Interface User's Guide Version 1.2, Dec. 6, 2000, SRI International, pp. 1-11.
Anderson et al., Detecting Unusual Program Behavior Using the Statistical Component of the Next-Generation Intrusion Detection Expert System (NIDES), May 1995, SRI International, pp. 1-89.
Lunt et al., Detecting Intruders in Computer Systems, 1993 Conference on Auditing and Computer Technology, SRI International, pp. 1-17.
Network ICE Products—ICEcap, Date Unknown, pp. 1-2.
Forlanda, The Secrets to Driving on BlackICE, Jan. 12, 2000, Network ICE, pp. 1-35.
BlackICE User's Guide Version 1.0 Beta Draft, 1999, Network ICE Corporation, pp. 1-59.
ICEcap Administrator's Guide Version 1.0 Beta Draft, 1999, Network ICE Corporation, pp. 1-25.
Shulak et al., ICEcap Advanced Administration Guide Version 3.0, 2001, Internet Security Systems Corporation, pp. 1-51.
"Real Secure, OS Sensor User Guide," Version 5.0, © Internet Security Systems, Inc. 199?-2000; Sep. 2000, pp. 1-64.
"Real Secure, User's Guide," Version 3.0, © 1992-1998, Internet Security Systems, Inc., pp. 1-128.
"System Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © 1999 by Internet Security Systems, Inc., pp. 1-38.
"Real Secure™, Manager for HP OpenView User Guide," Version 1.3, © 1999 by Internet Security Systems, Inc., pp. 1-48.
"Database Scanner, User Guide," Version 2.0, © 1992-1999, Internet Security Systems, Inc., pp. 1-112.

"Database Scanner™, User Guide," Version 4.0, © 2000 by Internet Security Systems, Inc., pp. 1-122.
"Database Scanner™, User Guide," Version 3.0.1, 0 1999 by Internet Security Systems, Inc., pp. 1-164.
"Real Secure™, Network Sensor User Guide," Version 5.0, © 2000 by, Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite Decisions, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"Sytem Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.
Internet Security Systems, Inc., "Introduction to RealSecure Version 5.0, The Industry's Only Integrated Host-Based and Network-Based Intrusion Detection System", Aug. 22, 2000, pp. 1-47.
Internet Security Systems, Inc., "RealSecure Network Sensor and Gigabit Network Sensor Policy Guide Version 7.0", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correlation and Analysis", an ISS White Paper, 2002, pp. 1-14.
Internet Security Systems, Inc., "RealSecure Site Protector Comparison Guide for Internet Scanner 7.0 Reporting Version 1.2", Mar. 2003, an ISS Tech Note, pp. 1-15.
Internet Security Systems, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently Asked Questions", Mar. 2003, pp. 1-8.
Internet Security Systems, Inc., "RealSecure SiteProtector Console User Reference Guide Version 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security System, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.
McGraw et al., "Secure Computing with Java: Now and the Future", 1997, http://java.sun.com/security/javaone97-whitepaper.html, pp. 1-20.
Using the CamNet BBS FAQ, http://www.cam.net.uk/manuals/bbsfaq/bbsfaq.htm, Jan. 17, 1997.
Express Storehouse Ordering System, "Accessing ESOS through the Network", http://www-bfs.ucsd.edu/mss/esos/man3.htm, Sep. 3, 1996.
Nasire, Nasirc Bulletin #94-10, http://cs-www.ncsl.nist.gov/secalert/nasa/nasa9410.txt, Mar. 29, 1994.
Packages in the net directory, http://linux4u.jinr.ru/usoft/WWW/www_debian.org/FTP/net.html, Mar. 20, 1997.
Aurobindo Sundaram, "An Introduction to Intrusion Detection", Copyright 1996, published at www.acm.org/crossroads/xrds2-4/intrus.html, pp. 1-12.
Didier Samfat, Refik Molva, IDAMN: An Intrusion Detection Architecture for Mobile Networks, IEEE Journal on Selected Areas in Communications, vol. 15, No. 7, Sep. 1997, pp. 1373-1380.
PCT Written Opinion, International Application No. PCT/US99/29117, International Filing date Dec. 7, 1999.
International Search Report, PCT/US99/29117, May 2, 2000.

* cited by examiner

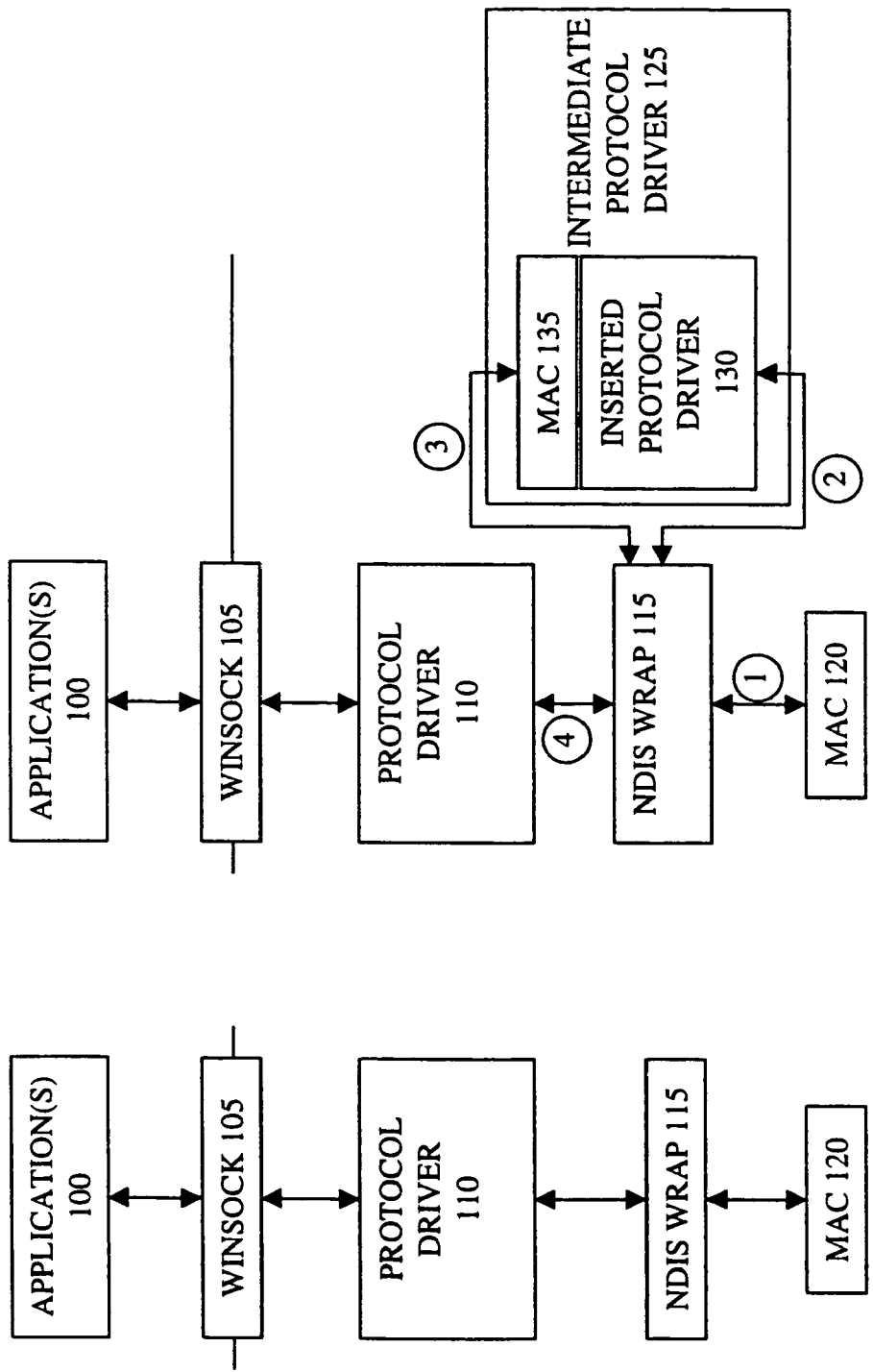

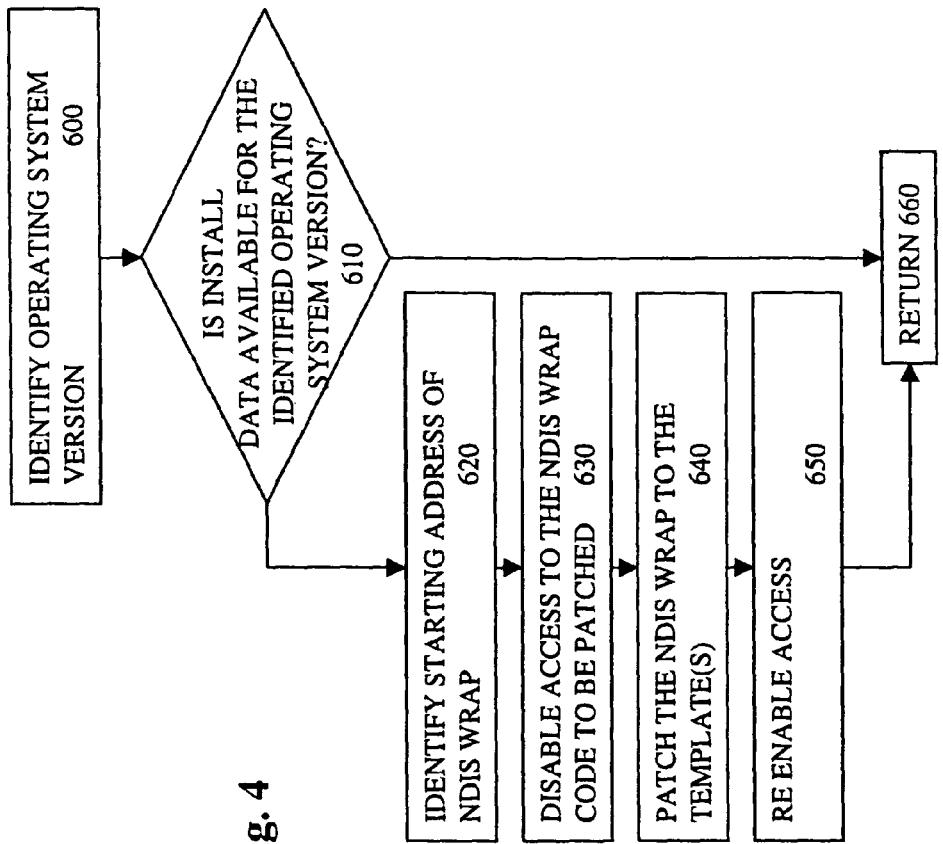
Fig. 6
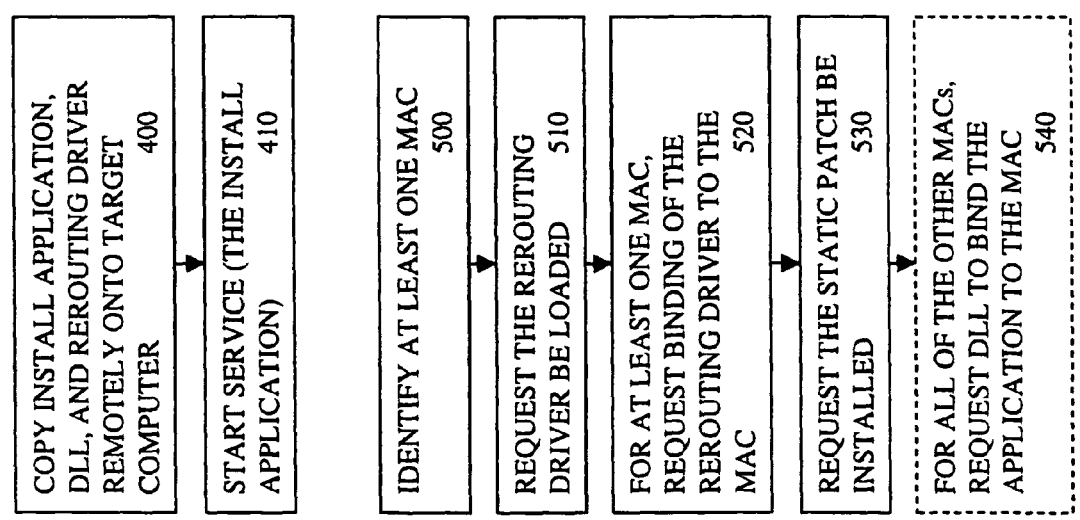
Fig. 4
Fig. 5

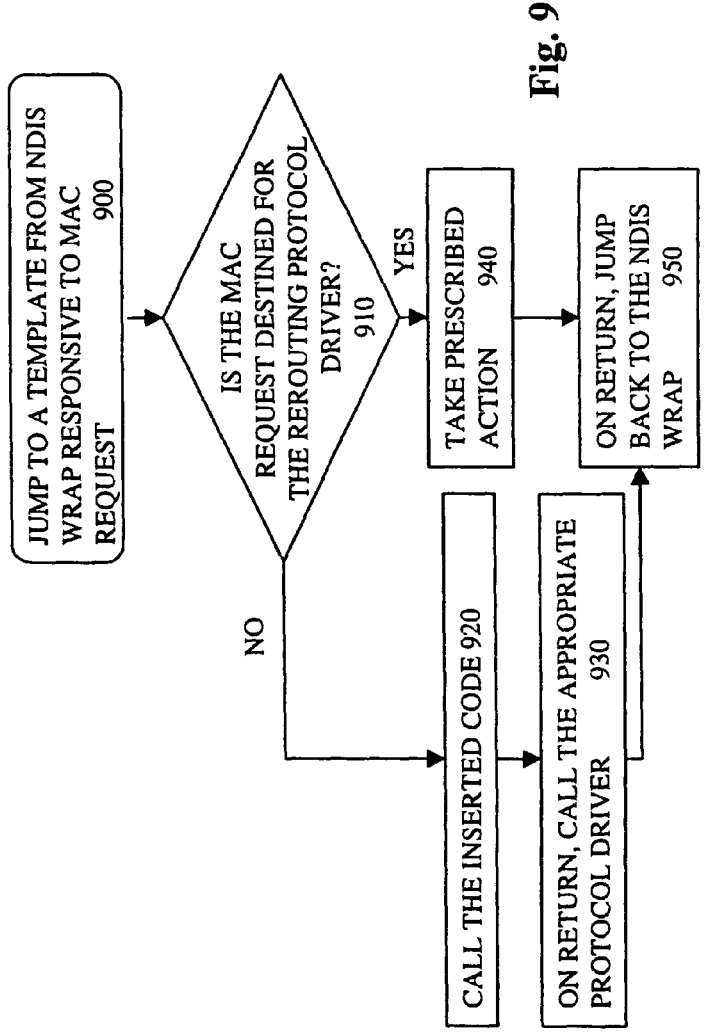

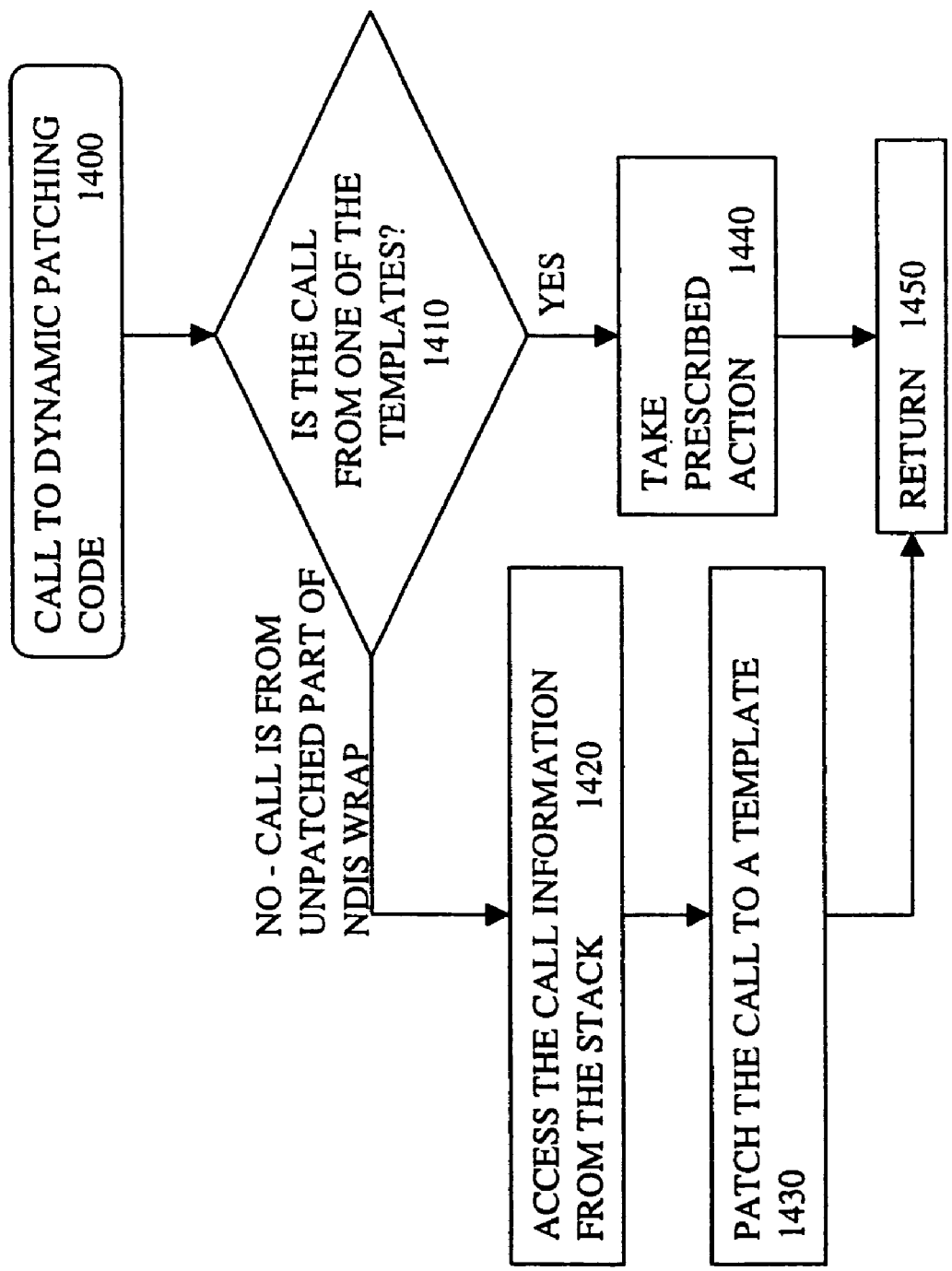

METHOD AND APPARATUS FOR REMOTE INSTALLATION OF NETWORK DRIVERS AND SOFTWARE

CROSS REFERENCE TO RELATED APPLICATION

This application is a divisional of U.S. application Ser. No. 09/456,894 filed Dec. 7, 1999 now U.S. Pat. No. 7,181,486, entitled, "Method and Apparatus for Remote Installation of Network Drivers and Software", the entire contents of which are hereby incorporated by reference.

BACKGROUND OF THE INVENTION

1. Field of the Invention

The present invention relates to the field of networked computer systems. More specifically, the invention relates to a method and apparatus for remote installation of network drivers and software in a computer system.

2. Background Information

Computer systems often communicate information with sources external to the computer, for example, over one or more networks. This information is frequently sent as smaller packets of information and transported over various network topologies, such as "Ethernet". The routing of the information is by various formats, or network protocols, for example, TCP/IP. In order for an end computer to receive and utilize the information, the computer must have the appropriate network protocol driver (hereinafter termed protocol driver). A protocol driver is usually connected in a computer's internal communication path between the network connection and an end application.

FIG. 1 is a block diagram illustrating media access control (MAC) unit to application communication according to the prior art. The block diagram is a simplified illustration of a computer system utilizing the Microsoft® Windows operating systems (e.g., Windows 95, Windows 98, Windows NT, etc.) (Manufactured by Microsoft Corp. of Redmond, Wash.). Information is initially received, for example, as packets, from the network by a media access control unit (MAC) 120. The MAC 120 is used to control access to the physical transmission medium on a network. The MAC 120 routes the information to the NDIS 115. The NDIS 115 is a network driver interface. The NDIS 115 receives the information and routes it to the appropriate protocol driver(s) shown as protocol driver(s) 110 (e.g., a TCP/IP driver). The protocol driver 110 receives the information and routes it to the WINSOCK 105. The WINSOCK is a interface program (Manufactured by Microsoft Corp. of Redmond, Wash.). The WINSOCK 105 receives the information and routes it to the appropriate application(s) 100.

At certain times it is useful to insert a different protocol driver into the existing communication path (hereinafter termed the binding) between the MAC 120 and the protocol driver(s) 110. When a new protocol driver is added to the existing binding, a new binding must be established which incorporates the new protocol driver. The new binding links the new protocol driver to the MAC 120.

FIG. 2 is a block diagram illustrating a prior art technique of inserting an intermediate driver in the system of FIG. 1. The intermediate driver is used to install a new protocol driver on an existing computer system. This method is more fully described in the "README" file for the ImSamp intermediate driver sample, IMSAMP.SYS. (Available from Microsoft Corp. of Redmond, Wash.).

In this method, the intermediate protocol driver 125 is bound to the NDIS 115. At Number 1, the MAC 120 routes information to the NDIS 115. At Number 2, the NDIS 115 receives the information and routes it to the intermediate protocol driver 125. Within the intermediate protocol driver 125, the information is passed to the inserted protocol driver 130 through the new binding. From the inserted protocol driver 130, the information is converted to the MAC layer format by MAC 135 in the intermediate protocol driver 110. At Number 3, the information is then passed from the MAC 135 to the NDIS 115 to enable continued routing of the information to the protocol driver 110. From the protocol driver 110, the information passes to the WINSOCK 105 and on to the appropriate application(s) 100.

The above-described prior art method has several limitations that impact its utility, particularly when implemented on networks with large numbers of computers. First, the intermediate protocol driver software must be manually installed on each computer. An individual, for example, a systems technician, must physically go to every computer and manually load the intermediate protocol driver software and the new protocol driver. This may involve a substantial time investment when many computers are involved simply to load the software. It also results in lost productivity for the computer operator as in-use applications must be exited during installation. Second, to enable the operation of the new protocol driver, the computer must be shut down and restarted. The necessity of shutdown and restart also requires that in-use applications be saved and exited. Where large numbers of computers are involved, this may result in large losses of productivity and can be disruptive of services provided by the network.

It should be noted that some operating systems provide mechanisms to remotely distribute software over the network. These systems generally include a server to which several computers are connected. In a remote distribution, the new software is loaded onto the server and then distributed to each of the individual computers, thus reducing installation time. However, even with the remote distribution, the installation of an intermediate protocol driver requires a user (e.g., a system technician) exit existing in-use applications, perform the installation, shut down the computer system, and then restart the computer system to enable operation of the new protocol driver.

BRIEF SUMMARY OF THE INVENTION

The present invention provides a method and apparatus for remote installation of network drivers and software. According to one embodiment of the invention, there is provided a computer implemented method for transmitting an installation application and a rerouting driver from a remote host to a first target computer on a network; the first target computer including a network driver interface that provides for communication between one or more media access control units and one or more protocol drivers according to a set of bindings. The remote host transmits to the first target computer a command to cause the first target computer to execute the installation application. In response to receipt of the command, the first target computer, executes the installation application. Responsive to execution of the installation application, the first target computer causes the modification of the network driver interface to insert the rerouting driver into the one or more communication paths provided by the set of bindings without restarting the first target computer.

BRIEF DESCRIPTION OF THE DRAWINGS

The invention may best be understood by referring to the following description and accompanying drawings which are used to illustrate embodiments of the invention. In the drawings:

FIG. 1 is a block diagram illustrating MAC to application communication according to the prior art;

FIG. 2 is a block diagram illustrating a prior art technique of inserting an intermediate driver in the system of FIG. 1;

FIG. 4 is a flow diagram illustrating the remote installation of the rerouting driver according to one embodiment of the invention;

FIG. 5 is a flow diagram illustrating the operation of the install application 325 according to one embodiment of the invention;

FIG. 6 is a flow diagram illustrating the operation of the static patching code 365 according to one embodiment of the invention;

FIG. 7 is a block of unmodified instruction code from the NDIS 315 prior to insertion of static patching code 365;

FIG. 8 is a diagram illustrating the patching of the NDIS 315 to call to one of template(s) 350 according to one embodiment of the invention;

FIG. 9 is a flow diagram illustrating the operation of one of template(s) 350 according to one embodiment of the invention;

DETAILED DESCRIPTION OF THE INVENTION

In the following description, numerous specific details are set forth to provide a thorough understanding of the invention. However, it is understood that the invention may be practiced without these specific details. In other instances, well-known connections, structures and techniques have not been shown in detail in order not to obscure the invention.

A method and apparatus for remote installation of network drivers and software in a computer system is described. To accomplish this, the invention allows for the remote installation of a rerouting driver in such a way that operation of the computer system can continue during installation, and the computer system does not require a shutdown and restart to enable operation of the rerouting driver.

Figure 3:
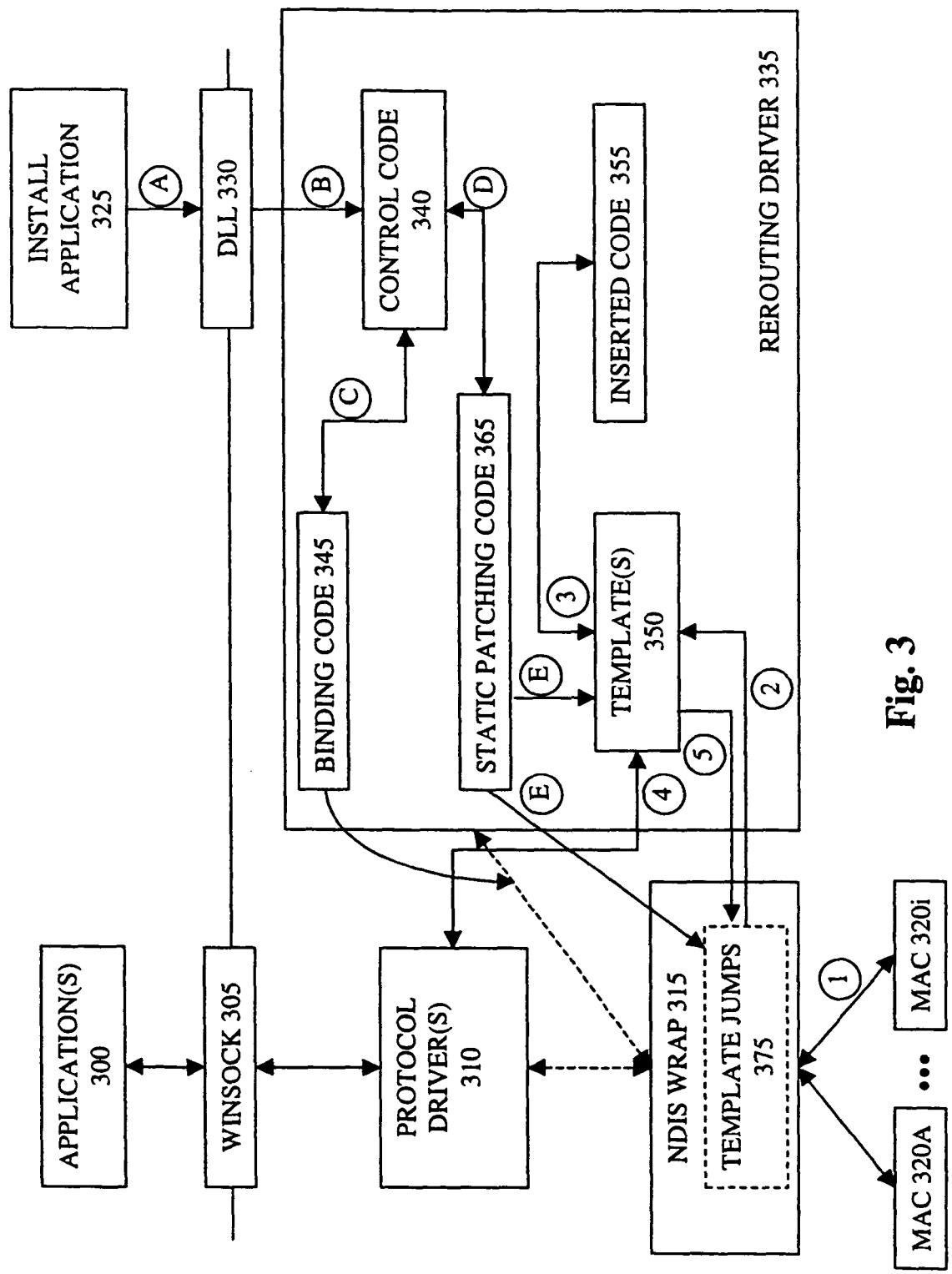
FIG. 3 is a block diagram illustrating the static patching of a rerouting driver between a MAC and protocol drivers according to one embodiment of the invention.

FIG. 3 is a block diagram illustrating the static patching of a rerouting driver between a MAC and protocol drivers according to one embodiment of the invention. Existing or future bindings resulting from the insertion of the rerouting driver are shown in solid lines. Existing or future bindings rerouted by the insertion of the rerouting driver are shown in dashed lines.

FIG. 3 shows, similar to the prior art, network information, such as packets, received by one or more MACs 320 A-i being routed to the NDIS 315. Prior to the installation of the static patch, the NDIS 315 routes the information to one or more protocol driver(s) 310. The protocol driver(s) 310 then routes the information to the WINSOCK 305 for further routing to the appropriate application(s) 300.

Either via remote distribution from a remote host (not shown) or by directly loading, an install application 325, DLL 330, and rerouting driver 335 are copied to memory in the target computer and the install application 325 is started. The install application 325 through the interface provided by the DLL 330 (see letters A and B) requests the rerouting driver 335 be loaded. The install application 325 requests control code 340 execute binding code 345 to establish a new binding between the rerouting driver 335 and at least one MAC 320A (see letter C). The install application 325 then requests control code 340 install the static patching code 365 (see letter D). At letter E, the static patching code 365 inserts template jump(s) 375 from the NDIS 315 to template(s) 350 in the rerouting driver 335. Particularly, NDIS 315 contains code with generic calls to perform information communication between the MAC(s) 320 and protocol driver(s) 310. The static patch replaces each of these calls with a jump to one of the template(s) 350. Details of the static patching code installation are later described herein with reference to FIG. 6. The binding may be continued for each MAC 320. After installation, the install application 325 may be deleted. At the completion of the static patch, the rerouting driver 335 has been inserted at the NDIS 315 between the MAC(s) 320 and the protocol driver(s) 310.

At Number 1, following the static patch, information received by one or more MAC(s) 320 is routed to the NDIS 315. At Number 2, information destined for protocol driver(s) 310 is then jumped from one of template jump(s) 375 to one of template(s) 350 in the rerouting driver 335. At Number 3, information received by the template(s) 350 can be routed to the inserted code 355. The inserted code 355 may be a new protocol driver, or another program, for example, a security program that can prevent further routing of the information. When the inserted code 355 is completed, the information is routed back to the template(s) 350. At Number 4, the template (s) 350 may route the information on to the protocol driver 310, or the information can be discarded if it is not desirable to pass the information further. At Number 5, a return jump to the NDIS 315 is executed.

It should be noted that, following installation of the static patching code 365, there are two types of bindings to the NDIS 315 over which the same information will be communicated. One binding was established on the initial binding of the NDIS 315 to the rerouting driver 335; this binding is represented in FIG. 3 as the dashed line between the NDIS 315 and the rerouting driver 335. The second type of binding is the original binding(s) between the NDIS 315 and the protocol driver(s) 310; these binding(s) are represented in FIG. 3 as the dashed line between the NDIS 315 and the protocol driver(s) 310. These bindings are essentially removed by the static patching because the rerouting driver 335 intercepts the call to the protocol driver 310 and later issues the call to the protocol driver(s) 310 on completion of the inserted code 355. To ensure that only one transmission of the information is routed to protocol driver 310, the rerouting driver 335 examines the incoming transmissions to determine if the information is destined for one of the protocol driver(s) 310 or itself. Information destined for one of the protocol driver(s) 310 is passed onto the inserted code 355. Information destined for the rerouting driver 335 can be discarded or be utilized for other purposes, for example, security purposes.

FIG. 4 is a flow diagram illustrating the remote installation of the rerouting driver 335 according to one embodiment of the present invention. At block 400, install application 325, the DLL 330, and rerouting driver 335 are remotely copied into the memory of a target computer networked from a remote host (not shown). At block 410, install application 325 is started using well-known remote service request techniques. It is to be noted that remote installation requires the manual installation of the software only at the remote host computer. A systems technician loads the software once at the remote host and then the software is copied to the other individual computers on the network. Thus, a systems technician does not waste productive time loading installation software at each individual computer in a network.

FIG. 5 is a flow diagram illustrating the operation of the install application 325 according to one embodiment of the invention. Once the install application 325 is started, at block 500, install application 325 identifies at least one MAC 320X. When a MAC 320X is identified, at block 510, install application 325 requests rerouting driver 335 be loaded. At block 520, install application 325 requests control code 340 execute binding code 345 to bind rerouting driver 335 to MAC 320X. At block 530, install application 325 requests control code 340 execute the static patching code 365. Operation of the static patching code 365 is further described herein with reference to FIG. 6. Once the static patching code 365 has been executed, at block 540, the install application 325 optionally requests DLL 330 to bind the install application 325 to any other MAC(s) 320. When all the MAC(s) 320 have been bound, the install application 325 may be deleted.

FIG. 6 is a flow diagram illustrating the operation of the static patching code 365 according to one embodiment of the invention. At block 600, control code 340 identifies the operating system version of the computer system. This step is necessary as static patching code 365 is selectively configured for different operating system versions. The selective configuration is predetermined by evaluating each version of an operating system to determine the offsets of the protocol driver(s) CALLs in the instruction code of the NDIS 315. These addresses can be determined using well-known debugging techniques.

At block 610, control code 340 identifies whether offset data is available for the identified operating system version to allow the installation of static patching code 365. If the offset data is not present, control code 340 returns to install application 325 for user notification (block 660). If the offset data is present, control code 340 identifies the starting memory address of NDIS 315 instruction code (see block 620). In block 630, control code 340 disables access to at least the specific code in the NDIS 315 that will be patched. In certain single processor computer systems, block 630 can be performed by disabling all interrupts. Techniques for performing block 630 in a multiprocessor computer system are later described herein with reference to FIG. 12.

In block 640, the instruction code in the NDIS 315 is statically patched with static patching code 365 by overwriting the instructions in each predetermined memory address (using the predetermined offsets) with template jump(s) 375 to template(s) 350 in the rerouting driver 335. The overwriting of the instructions with the static patch code 365 is later described herein with reference to FIGS. 7 and 8.

At block 650, control code 340 reenables access to the code in NDIS 315 that is now patched. In block 660, control code 340 returns to install application 325. The disabling and re-enabling of access to the code being patched in the NDIS 315 allows the patching (and thus the rerouting driver installation) to be performed without exiting in-use applications and a system shutdown/restart.

FIG. 7 is a block of unmodified instruction code from the NDIS 315 prior to insertion of static patching code 365. When NDIS 315 reaches instruction "CALL X" in the instruction stack, NDIS 315 calls the protocol driver currently identified by the variable "X" (e.g., one of the protocol driver(s) 310). During installation of static patching code 365, the instruction "CALL X" is overwritten with a template jump 375. The overwrite replaces the "CALL X" with a jump to one of the template(s) 350 in the rerouting driver 335, so that the template 350 instructions are executed instead of the call to the intended routines for the protocol driver X.

FIG. 8 is a diagram illustrating the patching of the NDIS 315 to call to one of templates(s) 350 according to one embodiment of the invention. The patching involves overwriting of the "CALL X" instruction with a template jump 375—a "JUMP" to a template 350 address in the rerouting driver 335. It should be noted that the length of the jump instruction overwrites both "CALL X" and "<INSTRUCTION 920>" previously shown in FIG. 7. The "JUMP" is then made to the address of the template 350. The template 350 may include new instructions (e.g., instruction 950) in which additional inserted code 355 may be executed or called. At the completion of additional inserted code 355, the template 350 would then execute the "CALL X" and the other replaced instructions (e.g., "<INSTRUCTION 920>") and jump back to the next address in NDIS 315, i.e., "<INSTRUCTION 930>". In this manner, a static patch to the rerouting driver 335 is introduced in the NDIS 315. This overwriting at specific memory addresses in the instruction code of the NDIS 315 is repeated until all the calls for that operating system are overwritten with different template jumps 375 which correspond to different templates 350.

FIG. 9 is a flow diagram illustrating the operation of one of template(s) 350 according to one embodiment of the invention. At block 900, a jump from a template jump 375 in the NDIS 315 to a template 350 is made responsive to a MAC request. As earlier discussed, this MAC request can be to a protocol driver 310 or to the rerouting driver 335 due to a dual binding established during installation of the static patching code 365. At block 910, the template 350 determines if the information is destined for the rerouting driver 335.

If the information was not destined for the rerouting driver 335, then it was destined for one of the protocol driver(s) 310 and the information was received through the static patching code 365. At block 920, the information is then routed to the inserted code 355. At completion of the inserted code 355, the information may or may not be routed to the appropriate protocol driver 310 via a CALL, depending upon the outcome of the inserted code 355 instructions. At block 930, if the call is to be routed on to the appropriate protocol driver(s) 310, upon return from the inserted code 355, the appropriate protocol driver 310 is called. At block 950, on return from the call, then a jump back from the template 350 to the NDIS 315 is executed. Alternatively, if the call was not to be routed on to the protocol driver(s) 310, the jump back to the NDIS 315, at block 950, is executed without routing the information to the protocol driver 310.

If the information is destined for the rerouting driver 335, the information was received through the binding of the NDIS 315 to the rerouting driver 335. At block 940, the template 350 would then execute a predetermined prescribed action. This action could be to discard the information, or to route the information to other code instructions. At block 950, on return from the prescribed action, the return jump back to the NDIS 315 is executed.

Thus, one embodiment of the present invention provides a method and apparatus for the remote installation of network drivers and software from a central host computer. The present invention may provide substantial advantages over the prior art techniques, especially when used on large networks of computers.

First, the remote installation of the present invention only requires a systems technician to install the application on a host computer for distribution to individual computers connected to the host. The remote installation alleviates the need for the system technician to manually load the software at each individual computer.

Second, the remote installation can be accomplished while the in-use system remains operating and does not require the shutdown and startup of the system to enable the operation of the new drivers and/or software. This alleviates the need to save and exit existing applications during installation and may result in a preservation of productive work time and system access.

Third, the prior art described with reference to FIG. 2 required that the information received by the intermediate protocol driver be converted by the intermediate protocol driver back into the MAC layer format for routing through the NDIS to the protocol drivers. Thus, a packet is converted from the MAC layer to the protocol layer format twice (a first time when originally transmitted from the MAC to the rerouting driver through the NDIS, and a second time when transmitted from the intermediate driver to the protocol driver through the NDIS). In contrast, the present invention does not require the second conversion to a MAC layer format to route the information from the rerouting driver to the protocol driver.

Although the above-described embodiment of the present invention was described in terms of a remote installation, it is to be understood that the invention can be manually installed on individual computers if so desired.

Alternative Embodiments

The above-described embodiment of the present invention provides a method and apparatus for the remote installation of network drivers and software. Another embodiment of the present invention utilizes the remote installation embodiment to install a distributed packet based security system on one or more individual computers of a network.

Currently networked computers are vulnerable to electronic intrusions over the network, for example, via the Internet. To restrict access to the computers on a network, computer networks often employ computer security measures that limit access to the network based on selected parameters.

Figure 10:
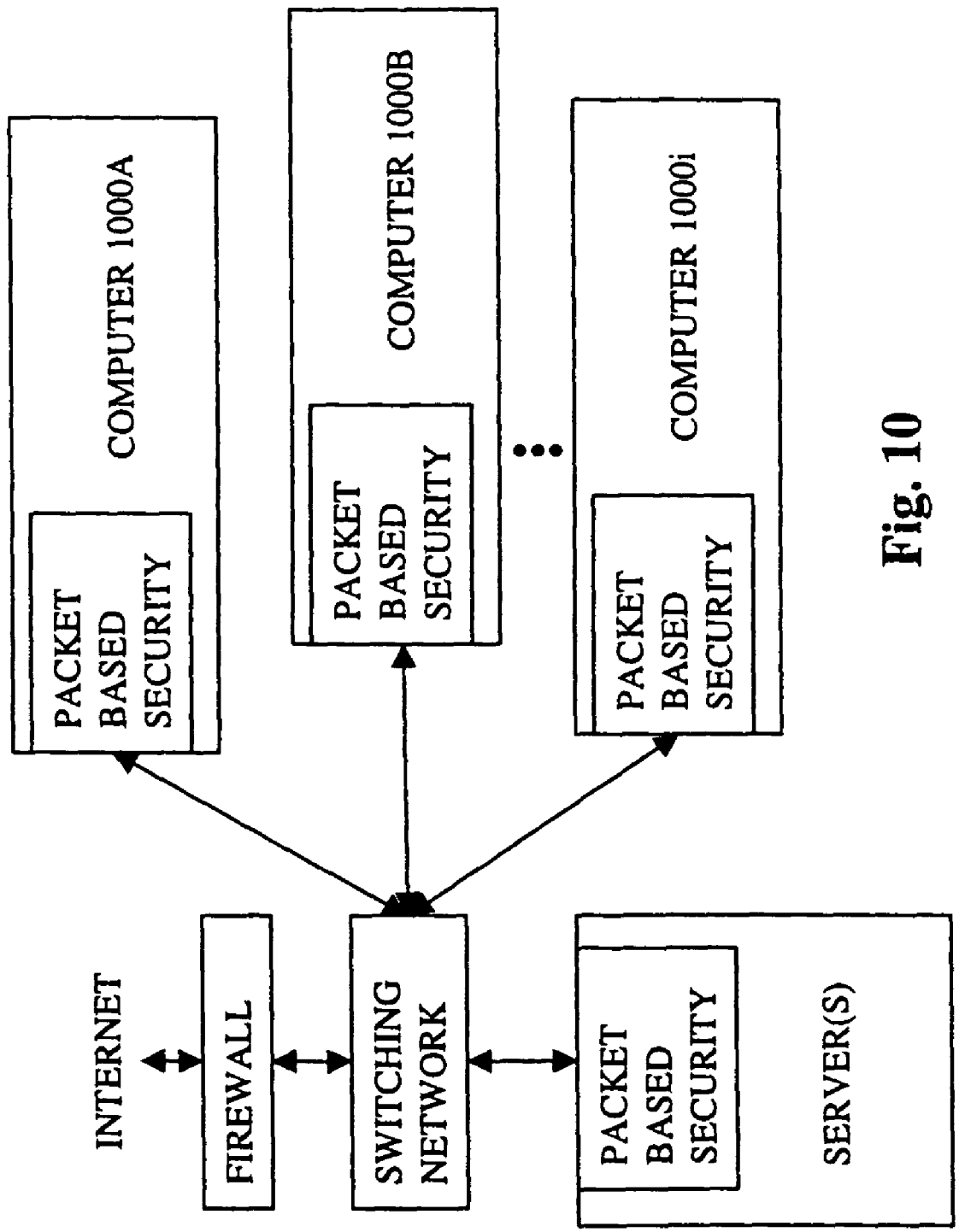
FIG. 10 is a block diagram illustrating a network with distributed packet based security according to one embodiment of the invention.

FIG. 10 is a block diagram illustrating a network with distributed packet based security according to one embodiment of the invention. Initial access security to the switching network is provided by a firewall. A firewall generally blocks access to a system except to those given access rights on an individual basis. The access requirements must be continually updated to remain current and effective. With large computer networks, maintaining current individual access authorizations can be time consuming and difficult to maintain. Therefore, another security measure, independent of the an access list, is a packet based security system.

Due to the ease of installation and/or low cost, the packet based security system can be installed on one or more of the server(s) and/or one or more of the individual computers 1000 A-i. The packet based security system evaluates the packets of information received over the network according to some predetermined standard.

In one embodiment of the present invention, a rerouting driver for a distributed packet based security system is provided which can evaluate received network information against predetermined and/or dynamic parameters. Based on those parameters, the system can either prevent or allow continued transmission of the information to a protocol driver. In this manner, undesirable information is stopped at the NDIS level and does not enter into the protocol driver or application level of a computer. Additionally, the invention provides the capability to save the non-transmitted information for further security evaluation. Further, the invention can be distributed and then installed on individual computers through a remote host while in operation (without shutdown and restart of each computer system).

Figure 11A:
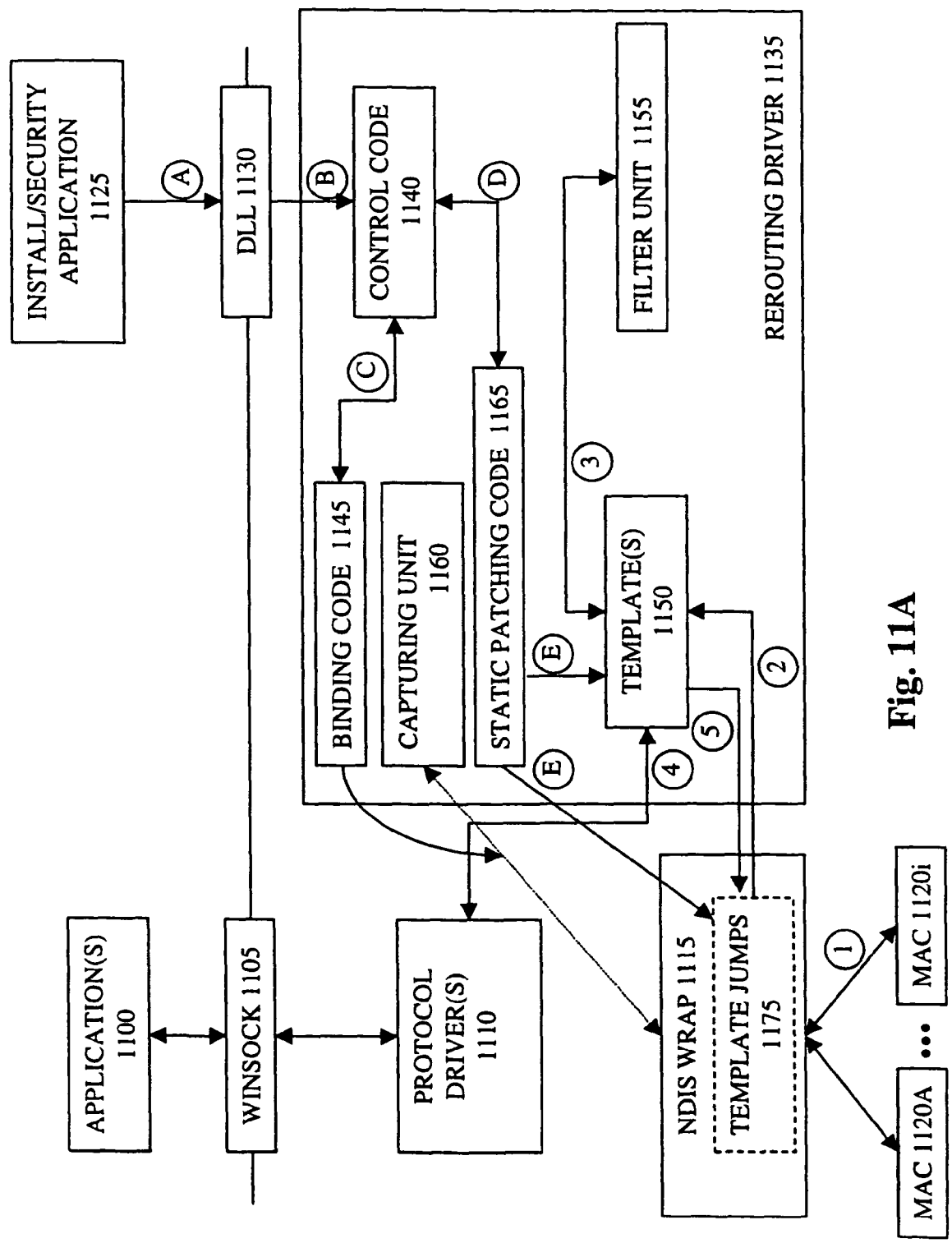
FIG. 11A is a block diagram illustrating the installation and partial operation of a rerouting driver for packet based security according to one embodiment of the invention.

FIG. 11A is a block diagram illustrating the installation and partial operation of a rerouting driver for packet based security according to one embodiment of the invention. Network information received by one or more MAC(s) 1120 is routed to the NDIS 1115. Prior to the installation of the rerouting driver 1135, the NDIS 1115 routes the information to the protocol driver 1110. The protocol driver 1110 then routes the information to the WINSOCK 1105 for further routing to the appropriate application 1100.

As previously described, the install/security application 1125, DLL 1130, and rerouting driver 1135 are copied to memory in the target computer and the install/security application 1125 is started. The install/security application 1125 through the interface provided by the DLL 1130 (see letters A and B) requests the rerouting driver 1135 be loaded. The install/security application 1125 requests control code 1140 execute binding code 1145 to establish a new binding between the capturing unit 1160 in the rerouting driver 1135 and at least one MAC 1120, referred to as MAC 1120X (see letter C). The install/security application 1125 then requests control code 1140 install the static patching code 1165 (see letter D). At letter E, the static patching code 1165 inserts template jumps 1175 from the NDIS 1115 to templates 1150 in the rerouting driver 1135. The binding to the capturing unit 1160 continues for each of the remaining MACs 1120 A-i. At the completion of the static patch, the rerouting driver 1135 has been inserted at the NDIS 1115 between the MAC(s) 1120 and the protocol driver(s) 1110.

As earlier described, there are now at least two bindings for each MAC. One binding was established on the initial binding of the NDIS 1115 to the capturing unit 1160 in the rerouting driver 1135; this binding is represented in FIG. 11A as the dashed line between the NDIS 1115 and the capture unit 1160. The remaining binding(s) are the original bindings between the NDIS 1115 and the protocol driver(s) 1110 which have been diverted to the rerouting driver 1135 by the static patch (not shown). As a result, for a given packet received from a MAC, the NDIS 1115 will attempt to CALL at least one of the protocol driver(s) 1110 and the capturing unit 1160. However, due to the static patch, each attempt will result in entry into one of the template(s) 1150. The circled numbers 1-5 in FIG. 11A illustrate when the NDIS 1115 attempts to CALL one of the protocol driver(s) 1110, while the circled numbers in FIG. 11B illustrates when the NDIS 1115 attempts to call the capturing unit 1160.

With reference to FIG. 11A, at Number 1, a request is made to the NDIS 1115 from a MAC 1120. At Number 2, a jump to a template 1150 is received from the template jump 1175 in the NDIS 1115 (upon an attempted call to the protocol driver 1110). The template 1150 determines if the request was destined for the rerouting driver 1135. If the answer is yes, then further actions related to packet based security are taken as later described herein with reference to FIG. 11B. If the answer is no, then the information was destined for a protocol driver 1110 (the topic of FIG. 11A).

At Number 3, the information is then routed to the filter unit 1155. The filter unit 1155 may include code to evaluate the information to determine if the information should be passed to the intended protocol driver 1110. If it is not desirable to pass the information further, the information can be discarded or further utilized by the filter unit 1155 and, at Number 5, a jump back to the NDIS 1115 is executed. If the information is determined to be acceptable, the information is routed back to the template 1150. At Number 4, the template 1150 then routes the information to the protocol driver 1110 by performing the CALL X extracted form the NDIS 1115 during the patching. At Number 5, on return from the protocol driver 1110 to the template 1150, a return jump to the NDIS 1115 is executed.

Figure 11B:
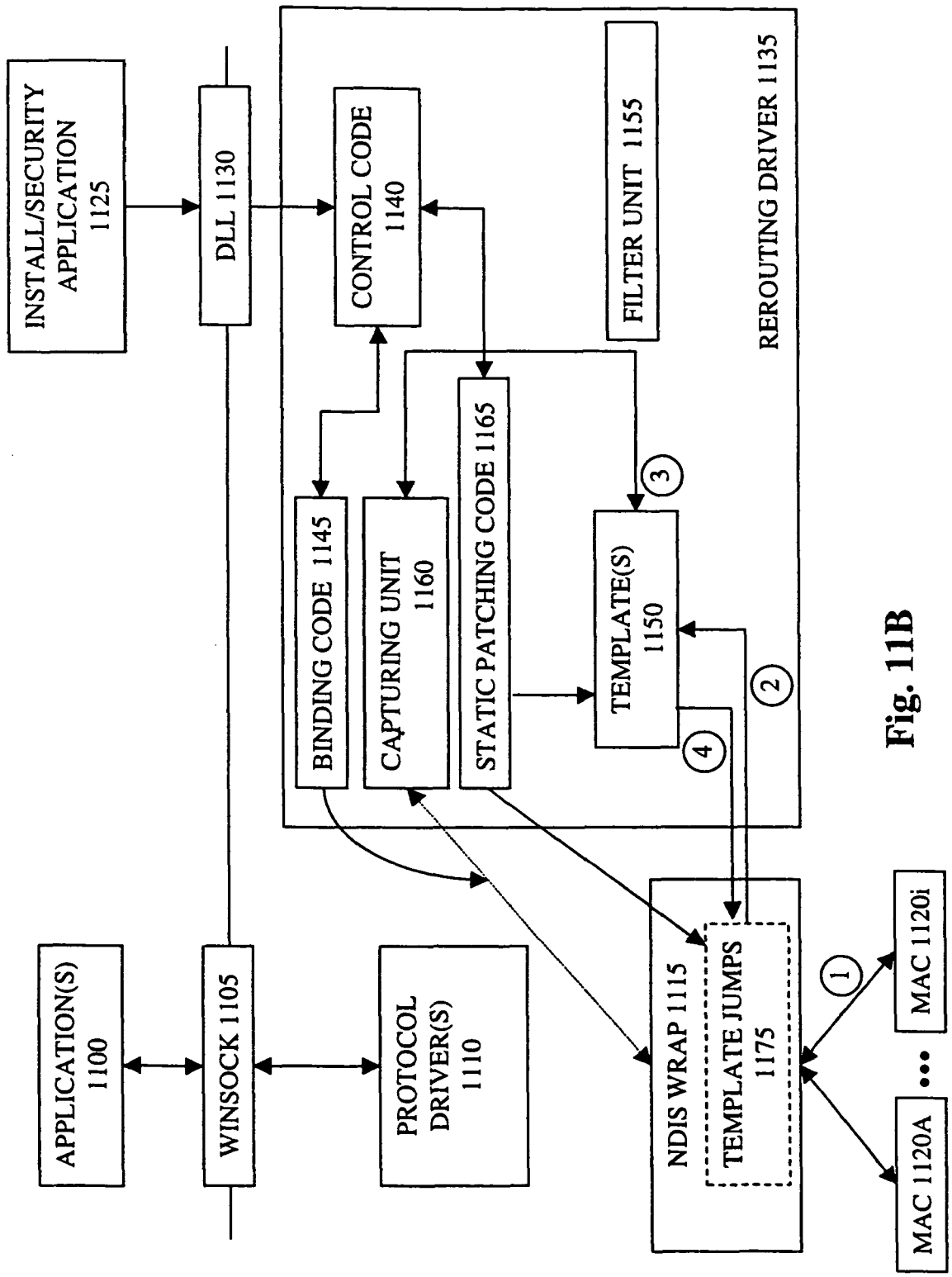
FIG. 11B is a block diagram illustrating another part of the operation of the rerouting driver for packet based security according to one embodiment of the invention.

FIG. 11B is a block diagram illustrating another part of the operation of the rerouting driver for packet based security according to one embodiment of the invention. Particularly, when the NDIS 1115 is attempting to call the rerouting driver 1135. In this case, at Number 2 a jump to template 1150 is again received from the template jump 1175 in the NDIS 1115 (upon the attempted call the rerouting driver 1135). The template 1150 determines the request was destined for the rerouting driver 1135. At Number 3, the information is passed to the capturing unit 1160 (e.g., by performing the CALL X extracted from the NDIS 1115 during patching). The capturing unit 1160 then saves the information according to predetermined instructions for further security evaluation, and at Number 4, a jump back to the NDIS 1115 is executed.

In one embodiment, further security evaluation of the information saved by the capturing unit 1160 (hereinafter termed the date) can be performed by another application, such as the install/security application. The captured information originates in the system address space (e.g., where the protocol drivers, rerouting driver, NDIS and MACs reside). Many applications need access to data originating from the system address space. The typical way this is accomplished is by making system calls (e.g., I/O APIs). These system calls are not very efficient in their use of CPU resources, typically copying memory to and from user address space into the system address space. In addition, these system calls also create at least two costly CPU state transitions from user to supervisor mode and back to user mode. One option to minimize the overhead is to run more of the code in the system address space. Doing this increases the difficulty in debugging the software and has the disadvantage of not being able to take advantage of multiple CPUs on many operating systems.

In one embodiment, a shared memory buffer is created between device drivers in system address space and application(s) in the user space. In this way an application can get access to data in system address space without any more overhead than a memory read. However, it is necessary to prevent conditions where a CPU executing driver code may be simultaneously modifying memory being accessed by a CPU executing the application.

To prevent this situation of simultaneous use, in one embodiment, two counters may be used to signal the state of the buffer. One counter ("write count") is the count of the number of items written into the memory buffer. Another counter ("read count") is the count of number of items read from the buffer. Only the producer modifies the "write count" and only the consumer modifies the "read count." If the "read count" is not equal to the "write count", then valid data is contained in the buffer. One example of this is shown below.

```
Application execution:
Loop:
    if "read count" <> "write count"
        Get next buffer
        Read next item
        Process item
        Increment read count
    Else
        Wait for signal
    endif
    Go to loop
System address execution:
Loop:
    Wait for incoming data
    Allocate empty buffer
    If allocation failed
        Discard data
        Go to loop
    endif
    Process data
    Write data into buffer
    Increment write count
    If "write count" = "1 + read count" ; put data into an empty buffer
        Send signal
    Go to loop
```

FIGS. 11A and 11B illustrate one embodiment of the present invention that provides packet-based security through utilization of the double binding to the NDIS 1115. Particularly, any bindings from the NDIS 1115 to the protocol driver(s) 1110 are used to route packets through the rerouting driver to the protocol driver(s) 1110. However, the bindings of the MAC(s) 1120 to the rerouting driver 1135 are used as a mechanism to capture the packets for later security evaluation. By providing a separate path for the capturing of the packets for security evaluation, a separate context is provided for this capturing process. As is well known in the art, the provision of a separate context allows greater programming flexibility during the capturing process.

In an alternative embodiment, the double bindings are not used. Rather, either the packets are not captured for later security evaluation or the packets are captured during the routing from the NDIS 1115 to the protocol driver(s) 1110. In a system in which the packets are captured during the routing from the NDIS 1115 to the protocol driver(s) 1110, each of the MAC(s) 1120 need not be bound to the rerouting driver 1135 (the optional step 540 from FIG. 5 is not performed).

For example, in one embodiment of the present invention, using only a single binding to the NDIS 1115, information that is deemed acceptable by the filter unit 1155, is routed to the template 1150 for routing to the appropriate protocol driver 1110. Information that is deemed not acceptable by the filter unit 1155, is then routed back to the template 1150 for routing to the capturing unit 1160.

Thus, there has been described alternative embodiments of the present invention which provide distributed packet based security. The embodiments provide for the intercept and evaluation of information packets received over a network by a rerouting driver with associated software. After evaluation, the information may be allowed continued routing to the protocol driver. Alternatively, the information may be stopped and/or saved for further security evaluations. The embodiments can be remotely distributed and installed on individual computers on a remote host while in operation without shutdown and restart of the computer system.

Further, while the present embodiment describes a system to provide distributed packet based security, other embodiments may be practiced by providing other evaluation parameters in the filter unit. For example, the filter unit could contain parameters to filter and capture information with particular routing information, and in this way monitor utilization of the network.

Also, it should be understood that although the alternative embodiments were described in terms of a remote installation, the embodiments can be manually installed on individual computers if so desired.

To avoid the shutdown and restart, access to predetermined instruction code in the NDIS should be disabled and then re-enabled to effect the overwriting of the memory addresses with static patch code. As above described, this can be done on certain single processor systems by disabling and reenabling interrupts. Each of the above-described embodiments can be alternatively implemented in multiprocessor systems by disabling and re-enabling access as described below.

Figure 12:
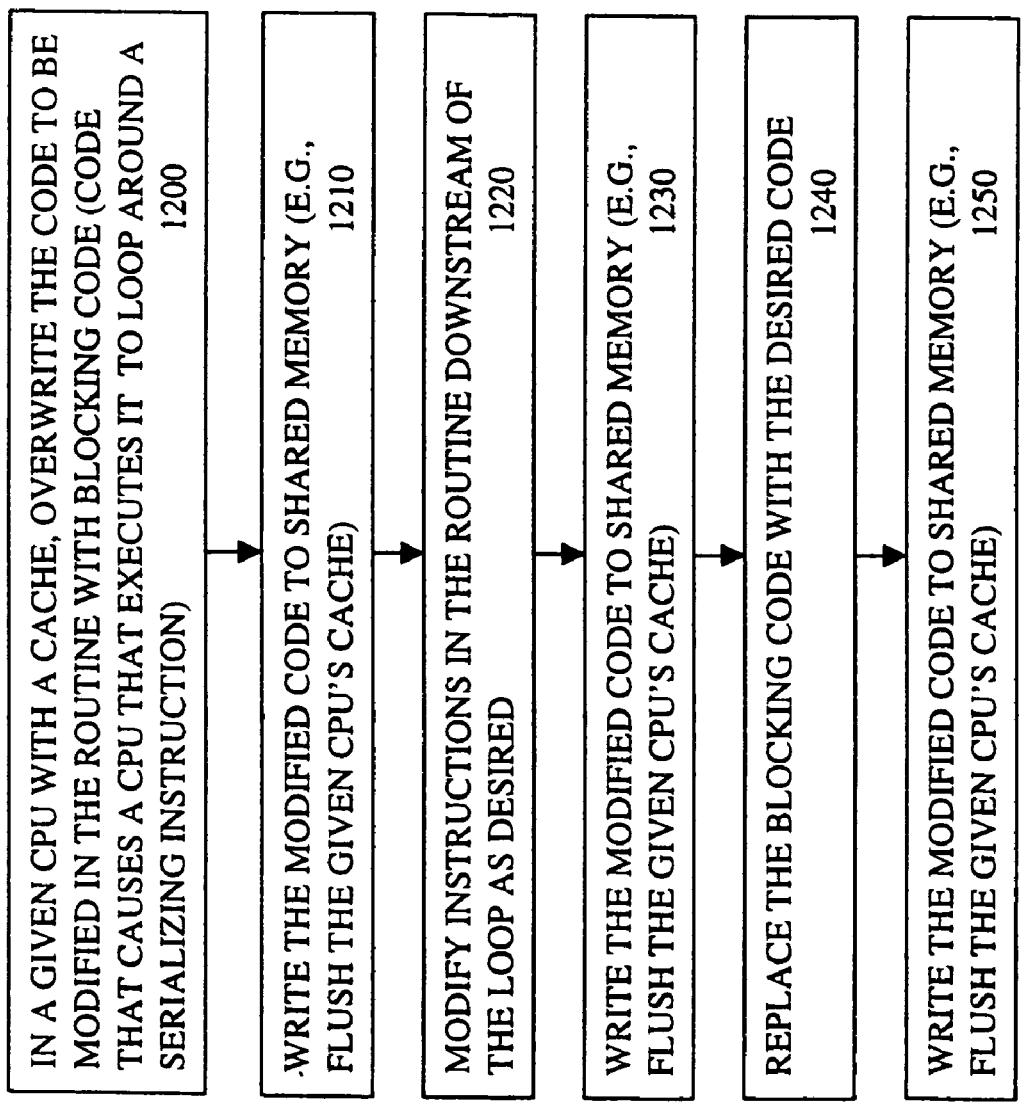
FIG. 12 is a flow diagram illustrating the disabling and re-enabling of access to code in a multiprocessor system according to one embodiment of the invention.

FIG. 12 is a flow diagram illustrating the disabling and re-enabling of access to code in a multiprocessor system according to one embodiment of the invention. At block 1200, in a given central processing unit (CPU), the code that is to be modified is brought into the cache of the given CPU and is overwritten with "blocking code" to create a first version of the code. The blocking code will prevent other CPUs from progressing past this code. While the blocking code can be implemented any number of ways, one way is to write code that causes the CPU to loop around a serializing instruction. As a result, any of the other CPUs (i.e., the CPUs not performing the patch), cannot access (are disabled) the code to be modified.

At block 1210, the first version of the code is written from the given CPU's cache into shared memory. As a result, if another CPU attempts to execute the code to be modified, it will access the blocking code from the shared memory.

At block 1220, the code beyond the blocking code can now be modified in the given CPU's cache as required to create a second version of the code. For example, in one embodiment, the code can be overwritten with template jumps to effect the static patch of the NDIS.

At block 1230, the second version of the code is written from the given CPU's cache into shared memory.

At block 1240, the previously inserted blocking code in the given CPU's cache is now overwritten with the desired code to create a third version of the code.

At block 1250, the third version of the code (without the blocking code) is written into shared memory. As a result, the patched code is in the shared memory and any CPU that now attempts to execute the code at that address will get the patched code.

Utilizing the above technique allows installation of the above-described alternative embodiments of the present invention on single and multiple processor systems.

The above-described embodiments have been described in terms of a static patch to predetermined instruction code addresses on the NDIS. Static patching requires that the offsets for the calls in the NDIS be predetermined. However, in certain situations, it is desirable to automate the identification of the CALL addresses in the NDIS and/or to accommodate different and/or new operating system versions utilizing different addresses. Accordingly, one embodiment provides a dynamic patch technique that patches individual instruction code locations as information is received from them by the rerouting driver. In this manner, incrementally each CALL is patched until all the specific instruction locations from which information was passed are patched.

Figure 13:
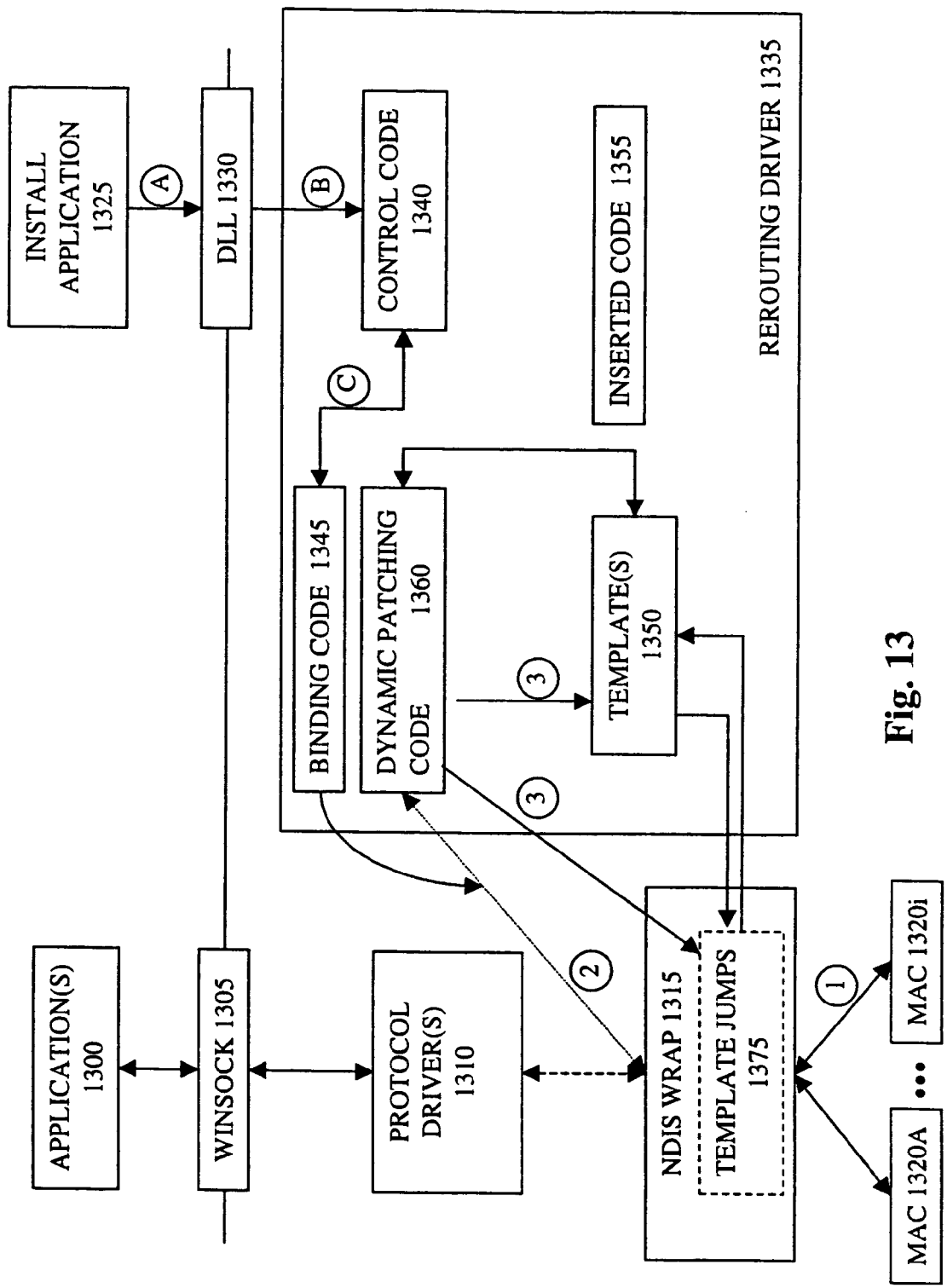
FIG. 13 is a block diagram illustrating the dynamic patching of a rerouting driver between MACs and protocol drivers according to one embodiment of the invention; and, FIG. 14 is a flow diagram illustrating the operation of the dynamic patching code 1360 according to one embodiment of the invention.

FIG. 13 is a block diagram illustrating the dynamic patching of a rerouting driver between MACs and protocol drivers according to one embodiment of the invention. As previously described, the install application 1325, DLL 1330, and rerouting driver 1335 are copied to memory in the target computer and the install application 1325 is started. The install application 1325 through the interface provided by the DLL 1330 requests the rerouting driver 1335 be loaded. The rerouting driver 1335 then requests control code 1340 execute binding code 1345 to establish a new binding between the dynamic patching code 1360 in the rerouting driver 1335 and every MAC 1320 A-i.

There is now one binding that will route information to the dynamic patching code 1360 in the rerouting driver 1335. This binding is represented in FIG. 13 as the dotted line between the NDIS 1315 and the dynamic patching code 1360. Now the rerouting driver 1335 waits to receive a packet of information in order to determine the location in the NDIS 1315 instruction code where it must insert a patch.

At Number 1, information is received by a MAC 1320 from the network. This information is forwarded to the NDIS 1315 for routing to the appropriate protocol driver(s) 1310 and/or the rerouting driver 1335. The NDIS 1315 forwards the information to the protocol driver 1310 as no patches of the NDIS 1315 have been made. Due to the multiple bindings, the NDIS 1315 additionally forwards the same information to the dynamic patching code 1360. The dynamic patching code 1360 determines if a dynamic patch should be made to the instruction code address that sent the information.

At Number 3, if a dynamic patch should be made to the instruction code address that sent the information, a dynamic patch is executed by the dynamic patching code 1360. The dynamic patching code 1360 will overwrite the specified code in the NDIS 1315 with a template jump 1375 to a template 1350 in the rerouting driver 1335. The next time information is passed through the NDIS 1315 at that instruction code location, information destined for protocol driver 1310 will be routed to the dynamic patching code 1360 in the rerouting driver 1335 for further action as described below with reference to FIG. 14.

FIG. 14 is a flow diagram illustrating the operation of the dynamic patching code 1360 according to one embodiment of the invention. At block 1400, the dynamic patching code 1360 receives a call. As the dynamic patching code is dually bound, this call could be from one of the templates or from the NDIS 1315. At block 1410, the dynamic patching code 1360 determines if the call is from one of the templates.

If the answer is yes, the call is routed to the inserted code for further action (see block 1440). On completion of the inserted code, the call is returned to the template for further action (see block 1450).

If the answer in block 1410 is no, the call was received from an unpatched part of the NDIS 1315. Therefore, action must be taken to patch the instruction code in the NDIS 1315. At block 1420, the call information is accessed from the CALL stack. At block 1430, the call is patched as previously described. From block 1430, control passes to block 1450.

Thus, there has been described one embodiment of the present invention which remotely installs protocol drivers using a dynamic patch of the NDIS. As some information must pass from the NDIS to the protocol driver to establish the location of the NDIS instruction code to be patched, the dynamic patch is not as initially effective as the static patch embodiments earlier described.

Embodiments can use combinations of the static/dynamic patching techniques. For example, if the data on a given operating system is available, the static patching technique is used. However, if the data is not available, the user is notified and/or the dynamic patching technique is used. As another example, the static patching technique could be used for all known calls and the dynamic patching technique could be installed in case one or more calls were missed.

While the invention has been described in relation to remote installation of protocol drivers and packet based security systems, the present invention may also be used for installation of other software that utilizes drivers that must be bound to the NDIS to be operational. In addition, while embodiments of the invention have been described in relation to a packet based security system, alternative embodiments could be implemented such that other inserted code could be utilized to perform other operations with the redundant code.

It is to be noted that the items shown in FIGS. 3-14 are stored and executed on a computer system. Such a computer system stores and communicates (internally and with other computer systems over a network) code and data using machine readable media, such a magnetic disks, optical disks, random access memory, read only memory, carrier waves, signals, etc. In addition, while one embodiment is described in which the parts of the present invention are implemented in software, alternative embodiments can implement one or more of these parts using any combination of software, firmware, and/or hardware.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A distributed packet based security program installed and enabled without shutdown or restart across a plurality of computers in a network that enables each of the plurality of computers to evaluate packets received over the network according to a predetermined standard and selectively allow transmission of such packets from the network to a protocol driver, the distributed packet based security program comprising filter code installed between a media access control unit and the protocol driver of each computer, the media access control unit being coupled to a physical transmission medium of the network to receive the packets from data provided across the medium.

2. The distributed packet based security program of claim 1, wherein the install is performed using a patching technique.

3. The distributed packet based security program of claim 1, wherein each of the plurality computers form a shared memory buffer between a user space that stores first code of the distributed packet based security program and a system address space that stores the protocol driver and second code of the distributed packet based security program, wherein the second code is coupled to the shared memory buffer to store information regarding packets received over the network, and wherein the first code is coupled to the shared memory buffer to evaluate information stored in the shared memory buffer.

4. The distributed packet based security program of claim 1, wherein the install is performed remotely from a host computer coupled to the network.

5. A computer system comprising:
a plurality of networked computers each including,
a media access control unit coupled to a physical transmission medium of the network to extract packets from data provided across the medium;
a protocol driver coupled to the media access control unit; and
filter code installed in between the media access control unit and the protocol driver and enabled without shutdown or restart to evaluate the packets and selectively allow continued transmission of different ones of the packets to the protocol driver.

6. The computer system of claim 5, wherein the install is performed using a patching technique.

7. The computer system of claim 5, wherein each of the plurality computers includes a shared memory buffer between a user space that stores a security application and a system address space that stores the media access control unit, the protocol driver, and the filter code, wherein the filter code is coupled to the shared memory buffer to store information regarding packets received over the network, and wherein the security application is coupled to the shared memory buffer to evaluate information stored in the shared memory buffer.

8. The computer system of claim 5, wherein the install is performed remotely from a host computer coupled to the network.

9. A computer implemented method comprising:
distributing from a remote host across a network to a plurality of computers code to be installed by each of said plurality of computers, each of said plurality of computers comprising routines to be executed to provide a communication path between a media access control unit coupled to the network and a protocol driver, the communication path for packets transmitted across the network;
transmitting from the remote host to each of the plurality of computers a command to cause each of the plurality of computers to execute the code; and
each of the plurality of computers, responsive to the command, installing the code in the communication path between the media access control unit and the protocol driver, the installed code being enabled, without restart of the computer, to determine whether to allow continued transmission of different ones of the packets received over the network along the communication path.

10. The computer implemented method of claim 9, wherein the installing is performed using a patching technique.

11. The computer implemented method of claim 9, wherein each of the plurality computers, responsive to the command, also forms a shared memory buffer between a system address space that stores the protocol driver and a user space that stores a security application, wherein the code is coupled to the shared memory buffer to store information regarding packets received over the network, wherein the application is coupled to the shared memory buffer to evaluate information stored in the shared memory buffer.

12. The computer implemented method of claim 9, wherein the installing comprises installing the code in-between a network driver interface and the protocol driver.

13. A computer program product comprising:
a computer-readable, tangible storage device;
first program instructions for distributing from a remote host across a network to a plurality of computers code to be installed by each of the plurality of computers, each of the plurality of computers comprising routines to be executed to provide a communication path between a media access control unit coupled to the network and a protocol driver, the communication path for packets transmitted across the network; and second program instructions for transmitting from the remote host to each of the plurality of computers a command to cause each of the plurality of computers to execute the code; and each of the plurality of computers, responsive to the command, installing the code in the communication path between the media access control unit and the protocol driver, the installed code being enabled, without restart of the computer, to determine whether to allow continued transmission of different ones of the packets received over the network along the communication path, wherein the first and second program instructions are stored on the computer-readable, tangible storage device.

14. The computer program product of claim 13, wherein the installing is performed using a patching technique.

15. The computer program product of claim 13, wherein each of the plurality computers, responsive to the command, also forms a shared memory buffer between a system address space that stores the protocol driver and a user space that stores a security application, wherein the code is coupled to the shared memory buffer to store information regarding packets received over the network, wherein the application is coupled to the shared memory buffer to evaluate information stored in the shared memory buffer.

16. The distributed packet based security program of claim 1, wherein each of the computers comprises:
    a program stored on a computer-readable tangible storage device and executed by a processor via a memory for running a network driver interface and the distributed packet based security program and for installing first and second code while the network driver interface is running; and
    a shared memory buffer between a user space that stores the first code and a system address space that stores the protocol driver and the second code,
    wherein the second code is coupled to the shared memory buffer to store information regarding packets received over the network, and
    wherein the first code is coupled to the shared memory buffer to evaluate information stored in the shared memory buffer.

17. The distributed packet based security program of claim 1, wherein the filter code is installed between the media access control unit and the protocol driver of each computer by:
    storing a rerouting driver comprising the filter code in memory of the computer;
    disabling access to a section of computer code in a network driver interface coupled between the media access control unit and the protocol driver by overwriting computer code that is executed before the section of computer code with blocking computer code;
    patching the section of computer code without stopping complete operation of the network driver interface, the patching of the section of computer code comprising inserting a template jump from the network driver interface to a template in the rerouting driver, the template comprising new computer code for controlling communications, the template jump and the template enabling the rerouting driver to control communication between the media access control unit and the protocol driver; and
    re-enabling access to the section of computer code by replacing the blocking computer code with the patched section of computer code.

18. The computer system of claim 5, further comprising a network driver interface, wherein the protocol driver is coupled to the media access control unit via the network driver interface, and wherein the filter code is installed such that the filter code is coupled to the network driver interface while the network driver interface is running.

19. The computer system of claim 5, wherein the filter code is installed between the media access control unit and the protocol driver of each networked computer by:
    storing a rerouting driver comprising the filter code in memory of the networked computer;
    disabling access to a section of computer code in a network driver interface coupled between the media access control unit and the protocol driver by overwriting computer code that is executed before the section of computer code with blocking computer code;
    patching the section of computer code without stopping complete operation of the network driver interface, the patching of the section of computer code comprising inserting a template jump from the network driver interface to a template in the rerouting driver, the template comprising new computer code for controlling communications, the template jump and the template enabling the rerouting driver to control communication between the media access control unit and the protocol driver; and
    re-enabling access to the section of computer code by replacing the blocking computer code with the patched section of computer code.

20. The computer implemented method of claim 9, wherein the code comprises a security filter.

21. The computer implemented method of claim 9, wherein installing the code in the communication path between the media access control unit and the protocol driver comprises:
    storing the code in memory;
    disabling access to a section of computer code in a network driver interface coupled between the media access control unit and the protocol driver by overwriting computer code that is executed before the section of computer code with blocking computer code;
    patching the section of computer code without stopping complete operation of the network driver interface, the patching of the section of computer code comprising inserting a template jump from the network driver interface to a template in the code, the template comprising new computer code for controlling communications, the template jump and the template enabling the code to control communication between the media access control unit and the protocol driver; and
    re-enabling access to the section of computer code by replacing the blocking computer code with the patched section of computer code.

22. The computer program product of claim 13, wherein the code comprises a security filter, and wherein the code is installed while the computer is running a network driver interface.

23. The computer program product of claim 13, wherein installing the code in the communication path between the media access control unit and the protocol driver comprises:
    storing the code in memory;
    disabling access to a section of computer code in a network driver interface coupled between the media access control unit and the protocol driver by overwriting computer code that is executed before the section of computer code with blocking computer code;

patching the section of computer code without stopping complete operation of the network driver interface, the patching of the section of computer code comprising inserting a template jump from the network driver interface to a template in the code, the template comprising new computer code for controlling communications, the template jump and the template enabling the code to control communication between the media access control unit and the protocol driver; and re-enabling access to the section of computer code by replacing the blocking computer code with the patched section of computer code.

24. A computer program product comprising:

a computer-readable, tangible storage device;

first program instructions for receiving code at a computer from a network to be installed by the computer, the computer comprising routines to be executed to provide a communication path between a media access control unit coupled to the network and a protocol driver, the communication path for packets transmitted across the network; and second program instructions for receiving a command to cause each of the plurality of computers to execute the code; and third program instructions to, responsive to the command, install the code in the communication path between the media access control unit and the protocol driver, the installed code being enabled, without restart of the computer, to determine whether to allow continued transmission of different ones of the packets received over the network along the communication path, wherein the first, second, and third program instructions are stored on the computer-readable, tangible storage device.

25. The computer program product of claim 24, wherein the third program instructions to install the code between the media access control unit and the protocol driver comprises:

fourth program instructions for storing the code in memory;

fifth program instructions for disabling access to a section of computer code in a network driver interface coupled between the media access control unit and the protocol driver by overwriting computer code that is executed before the section of computer code with blocking computer code;

sixth program instructions for patching the section of computer code without stopping complete operation of the network driver interface, the patching of the section of computer code comprising inserting a template jump from the network driver interface to a template in the code, the template comprising new computer code for controlling communications, the template jump and the template enabling the code to control communication between the media access control unit and the protocol driver; and seventh program instructions for re-enabling access to the section of computer code by replacing the blocking computer code with the patched section of computer code, wherein the fourth, fifth, sixth, and seventh program instructions are stored on the computer-readable, tangible storage device.

* * * * *